US00RE47454E

(19) United States
(12) Reissued Patent
Boyes et al.

(10) Patent Number: US RE47,454 E
(45) Date of Reissued Patent: Jun. 25, 2019

(54) CLUTCHED DRIVEN DEVICE AND ASSOCIATED CLUTCH MECHANISM

(71) Applicant: Litens Automotive Partnership, Woodbridge (CA)

(72) Inventors: Andrew M. Boyes, Aurora (CA); Gary J. Spicer, Mississauga (CA)

(73) Assignee: Litens Automotive Partnership, Woodbridge, ON

(21) Appl. No.: 15/638,606

(22) Filed: Jun. 30, 2017

Related U.S. Patent Documents

Reissue of:
(64) Patent No.: 9,068,603
Issued: Jun. 30, 2015
Appl. No.: 13/812,607
PCT Filed: Aug. 24, 2011
PCT No.: PCT/CA2011/000981
§ 371 (c)(1),
(2) Date: Jan. 28, 2013
PCT Pub. No.: WO2012/024790
PCT Pub. Date: Mar. 1, 2012

U.S. Applications:
(60) Provisional application No. 61/376,489, filed on Aug. 24, 2010.

(51) Int. Cl.
*F16D 41/20* (2006.01)
*F16D 28/00* (2006.01)
(Continued)

(52) U.S. Cl.
CPC ..... *F16D 13/14* (2013.01); *F16D 13/02* (2013.01); *F16D 13/12* (2013.01); *F16D 27/105* (2013.01); *F16D 23/12* (2013.01); *F16D 28/00* (2013.01)

(58) Field of Classification Search
CPC ..... F16D 13/14; F16D 13/12; F16D 27/105; F16D 13/02; F16D 23/12; F16D 28/00; F16D 13/025
See application file for complete search history.

(56) References Cited

U.S. PATENT DOCUMENTS 2,984,325 A * 5/1961 Tomko et al. ..... 192/81 C
3,735,847 A 5/1973 Brucken
(Continued)

FOREIGN PATENT DOCUMENTS

CN 1477317 A 2/2004
CN 1540180 A 10/2004
(Continued)

OTHER PUBLICATIONS

IPRP for PCT/CA2011/000981 dated Nov. 17, 2011.
(Continued)

*Primary Examiner* — Sara S Clarke
(74) *Attorney, Agent, or Firm* — Millman IP Inc.

(57) ABSTRACT

A clutched driven device (10) having a clutch assembly (16) with a first rotary clutch portion (50), a second rotary clutch portion (52), a bearing (54), a wrap spring (56) and an actuator (60). The first rotary clutch portion has an interior clutch surface (76). The first and second rotary clutch portions are rotatably disposed about a rotary axis (70) of the clutched driven device. The bearing is received between the first and second rotary clutch portions and supports the first rotary clutch portion for rotation on the second rotary clutch portion. The wrap spring is disposed radially inwardly of the bearing and has a plurality of helical coils (114) that are received against the interior clutch surface. The actuator is configured to selectively initiate coiling of the wrap spring to cause the helical coils of the wrap spring to disengage the interior clutch surface to a predetermined extent.

20 Claims, 16 Drawing Sheets

(51) Int. Cl.

| | |
|---|---|
| ***F16D 27/105*** | (2006.01) |
| ***F16D 23/12*** | (2006.01) |
| ***F16D 13/14*** | (2006.01) |
| ***F16D 13/12*** | (2006.01) |
| ***F16D 13/02*** | (2006.01) |

(56) References Cited

U.S. PATENT DOCUMENTS

| | | | | | |
|---|---|---|---|---|---|
| 3,831,723 | A | | 8/1974 | Briar et al. | |
| 3,865,222 | A | | 2/1975 | Briar | |
| 4,201,281 | A | | 5/1980 | MacDonald | |
| 4,225,027 | A | * | 9/1980 | Takefuta et al. | 192/84.81 |
| 4,262,787 | A | | 4/1981 | Takefuta et al. | |
| 4,273,226 | A | | 6/1981 | Takefuta et al. | |
| 4,418,811 | A | | 12/1983 | MacDonald | |
| 4,466,522 | A | | 8/1984 | Shibuya | |
| 4,619,351 | A | | 10/1986 | Takatoshi | |
| 4,674,612 | A | | 6/1987 | Ogura | |
| 4,704,554 | A | | 11/1987 | Nishimura | |
| 4,825,988 | A | | 5/1989 | Nishimura | |
| 4,840,259 | A | * | 6/1989 | Guslits et al. | 192/48.2 |
| 5,029,689 | A | | 7/1991 | Grimm | |
| 5,031,744 | A | | 7/1991 | Nishimura | |
| 5,076,216 | A | | 12/1991 | Ro | |
| 5,080,214 | A | | 1/1992 | Fossum | |
| 5,090,538 | A | | 2/1992 | Osawa | |
| 5,967,274 | A | | 10/1999 | Leone et al. | |
| 6,209,698 | B1 | | 4/2001 | Wussow | |
| 6,484,861 | B1 | | 11/2002 | Wussow | |
| 6,488,133 | B1 | | 12/2002 | Maurice et al. | |
| 6,581,743 | B2 | | 6/2003 | Moroi et al. | |
| 6,915,887 | B2 | | 7/2005 | Faller et al. | |
| 2006/0100050 | A1 | | 5/2006 | Cris et al. | |
| 2008/0017468 | A1 | | 1/2008 | Krafft et al. | |
| 2008/0041686 | A1 | | 2/2008 | Hoshino et al. | |
| 2010/0230227 | A1 | | 9/2010 | Parsons et al. | |

FOREIGN PATENT DOCUMENTS

| | | | | | |
|---|---|---|---|---|---|
| EP | 1884678 | A | | 2/2008 | |
| EP | 1884678 | A1 | | 2/2008 | |
| EP | 1887224 | A1 | | 2/2008 | |
| GB | 2034830 | A | | 6/1980 | |
| GB | 2034830 | B | | 6/1980 | |
| GB | 2109485 | A | * | 6/1983 | F16D 13/02 |
| GB | 2156016 | A | | 10/1985 | |
| JP | 60 175830 | A | | 9/1985 | |
| JP | 50175830 | A | | 9/1985 | |
| JP | 10073133 | A | | 3/1998 | |
| WO | 2003104673 | A1 | | 12/2003 | |
| WO | WO-03/104673 | A1 | | 12/2003 | |
| WO | 2006099731 | A1 | | 9/2006 | |
| WO | 2008061749 | A | | 5/2008 | |
| WO | WO-2008061749 | A1 | | 5/2008 | |
| WO | 2010054487 | A1 | | 5/2010 | |
| WO | WO-2010/054487 | A1 | | 5/2010 | |

OTHER PUBLICATIONS

Chinese Office Action for 201180041178.5, dated Dec. 17, 2014.

International Search Report and Written Opinion for PCT/CA2011/000981, mailed Nov. 17, 2011; ISA/CA.

* cited by examiner

CLUTCHED DRIVEN DEVICE AND ASSOCIATED CLUTCH MECHANISM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a 371 U.S. National Stage of International Application No. PCT/CA2011/000981, filed on Aug. 24, 2011, and claims the benefit of U.S. Provisional Application No. 61/376,489, filed on Aug. 24, 2010. The entire disclosures of the above applications are incorporated herein by reference.

INTRODUCTION

The present disclosure relates to a clutched driven device and an associated clutch mechanism.

BACKGROUND

This section provides background information related to the present disclosure which is not necessarily prior art.

It is often desired to power a device with rotary power that is transmitted from a prime mover either directly or through an endless power transmitting element, which could employ a belt, a chain and/or a toothed gear. Such devices could, for example be connected to the engine of a motor vehicle via an accessory drive or a timing drive and could include a pump (e.g., water pump, vacuum pump, power steering pump, air compressor, air conditioning compressor), a means for generating electricity (e.g., alternator, generator, starter-alternator, starter-generator), and/or a fan, for example.

It will be appreciated that in situations when the output of the device is not needed or desired, operation of the device will be associated with reduced efficiency of the prime mover. In an automotive context for example, it may not be necessary to operate the engine water pump when the engine is cold and is being started and as such, the operation of the engine water pump when the engine is cold and being started reduces the overall fuel efficiency of the engine. To overcome this drawback, it was known in the art to provide a clutch to selectively operate the device. Such clutches typically required some sort of power, usually electrical power, to permit rotary power to be transmitted through the clutch to drive the device. More recently, several types of clutches have been developed by Litens Automotive Partnership that can be configured to transmit rotary power to a driven device in a normal or unpowered state and inhibit transmission of rotary power to the driven device in a power state that uses a relatively low-power input.

While such clutches are suitable for their intended purposes, such clutches are nonetheless susceptible to improvement.

SUMMARY

This section provides a general summary of the disclosure, and is not a comprehensive disclosure of its full scope or all of its features.

In a first aspect of the present disclosure, a clutched driven device is provided having a wrap spring that is disposed radially inwardly of a bearing that supports a first rotary clutch portion relative to a second rotary clutch portion. In one exemplary form, the present teachings provide a clutched driven device having a clutch assembly with a first rotary clutch portion, a second rotary clutch portion, a bearing, a wrap spring and an actuator. The first rotary clutch portion has a drive member with an interior clutch surface. The first and second rotary clutch portions are rotatably disposed about a rotary axis of the clutched driven device. The bearing is received between the first and second rotary clutch portions. The wrap spring is disposed radially inwardly of the bearing and has a first end, a second end opposite to the first end, and a plurality of helical coils that extend between the first and second ends. The first end is configured to transmit rotary power to the second rotary clutch portion. The helical coils are received against the interior clutch surface. The actuator is configured to selectively initiate coiling of the wrap spring to cause the helical coils of the wrap spring to disengage the interior clutch surface to a predetermined extent. The actuator includes an actuator input member. The actuator input member is rotatable about the rotary axis and has a spring mount, which engages the second end of the wrap spring, and a brake rotor. The actuator is selectively operable to generate a brake force that is applied to the brake rotor to resist rotation of the actuator input member about the rotary axis.

In a second aspect of the present disclosure, a clutched driven device is provided having a brake band that is moved via a pivot arm to provide a drag force that controls operation of a clutch assembly. In an exemplary form, the present teachings provide a clutched driven device having a clutch assembly with a first rotary clutch portion, a second rotary clutch portion, a wrap spring and an actuator. The first rotary clutch portion has a drive member with an interior clutch surface. The first and second rotary clutch portions are rotatably disposed about a rotary axis of the clutched device. The wrap spring has a first end, a second end opposite to the first end, and a plurality of helical coils that extend between the first and second ends. The first end is configured to transmit rotary power to the second rotary clutch portion. The helical coils are received against the interior clutch surface. The actuator is configured to selectively initiate coiling of the wrap spring to cause the helical coils of the wrap spring to disengage the interior clutch surface to a predetermined extent. The actuator includes an actuator input member that is rotatable about the rotary axis and has a spring mount, which engages the second end of the wrap spring, and a brake rotor. The actuator further includes a brake shoe and a pivot arm. The brake shoe is a band that extends at least partly about a circumference of the brake rotor. The pivot arm is coupled to at least one end of the band and is configured to selectively engage the band to the brake rotor.

In a third aspect of the present disclosure, a clutched driven device is provided having a clutch assembly with a wrap spring and an actuator having a cable for controlling engagement of the wrap spring. In an exemplary form, the present teachings provide a clutched driven device having a clutch assembly with a first rotary clutch portion, a second rotary clutch portion, a wrap spring and an actuator. The first rotary clutch portion has a drive member with an interior clutch surface. The first and second rotary clutch portions are rotatably disposed about a rotary axis of the clutched device. The wrap spring has a first end, a second end opposite to the first end, and a plurality of helical coils that extend between the first and second ends. The first end is configured to transmit rotary power to the second rotary clutch portion. The helical coils are received against the interior clutch surface. The actuator is configured to selectively initiate coiling of the wrap spring to cause the helical coils of the wrap spring to disengage the interior clutch surface to a predetermined extent. The actuator includes an actuator input member that is rotatable about the rotary axis and has a spring mount, which engages the second end of the wrap spring, and a brake rotor. The actuator further includes a cable that is movable to control rotation of the brake rotor relative to the first clutch portion.

In a fourth aspect of the present disclosure, a clutched driven device is provided having a clutch assembly with a wrap spring and an actuator. The actuator comprises a brake rotor and a linear motor for selectively applying a drag torque to the brake rotor that controls engagement and/or disengagement of the wrap spring. In an exemplary form, the present teachings provide a clutched driven device with a clutch assembly that includes a first rotary clutch portion, a second rotary clutch portion, a wrap spring and an actuator. The first rotary clutch portion has a drive member with an interior clutch surface, the first and second rotary clutch portions are rotatably disposed about a rotary axis of the clutched device, the wrap spring has a first end, a second end opposite to the first end, and a plurality of helical coils that extend between the first and second ends, the first end is configured to transmit rotary power to the second rotary clutch portion, the helical coils are received against the interior clutch surface, the actuator is configured to selectively initiate coiling of the wrap spring to cause the helical coils of the wrap spring to disengage the interior clutch surface to a predetermined extent, the actuator comprising an actuator input member and a linear motor, the actuator input member is rotatable about the rotary axis and has a spring mount, which engages the second end of the wrap spring, and a brake rotor, the linear motor has an output member, and wherein the linear motor is operated to move the output member to generate a brake force that is applied to the brake rotor to resist rotation of the actuator input member about the rotary axis.

The clutched driven device in accordance with the teachings of the fourth aspect of the present disclosure:

may further comprise a bearing that is received between the first and second rotary clutch portions and supports the first rotary portion for rotation on the second rotary clutch portion and the wrap spring may optionally be disposed radially inwardly of the bearing;

may further comprise a working device that includes at least one of a pump, a fan and a means for generating electricity, the working device having an input shaft coupled to the second clutch portion for rotation therewith;

may be configured such that the actuator includes a brake shoe that engages the brake rotor to generate the brake force, and optionally: the actuator may further comprise a solenoid that is operable for moving the brake shoe into and/or out of contact with the brake rotor; the brake shoe may be mounted to an output member of the solenoid; the brake shoe may be coupled to the output member through at least one of a cable and a linkage; the actuator may further comprise a fluid-powered cylinder that is operable for moving the brake shoe into and/or out of contact with the brake rotor; the brake shoe may comprise a band that is wrapped at least partly around the brake rotor; the actuator may comprise a rotary motor that is operable for moving the brake shoe into and/or out of contact with the brake rotor; the rotary motor may be coupled to the brake shoe through at least one of a cable, a lead screw, and a rack-and-pinion; the actuator may further comprise a phase change material that has a first volume when the phase change material is in a first phase and a second volume when the phase change material is in a second phase that is different from the first phase, and wherein the first and second phases are selected from a group consisting of a solid phase, a liquid phase and a gaseous phase; the phase change material may be wax; and/or the actuator may further comprise a heater; and/or may be configured such that the actuator comprises a coil and an armature, wherein the coil is operated to move the armature to generate the brake force, and wherein the armature is the output member and optionally the armature may be non-rotatably but axially movably coupled to the brake rotor and/or the coil may be disposed in a coil housing that is contacted by the armature to generate the brake force.

In a fifth aspect of the present disclosure, a clutched driven device is provided having a clutch assembly with a wrap spring and an actuator for controlling engagement and/or disengagement of the wrap spring to selectively transmit rotary power through the clutch assembly. The actuator comprises a brake rotor and a helical coil spring whose diameter can be changed to engage or disengage the brake rotor to selectively apply a drag torque to the brake rotor that controls engagement and/or disengagement of the wrap spring. In an exemplary form, the present teachings provide a clutched driven device with a clutch assembly having a first rotary clutch portion, a second rotary clutch portion, a wrap spring and an actuator. The first rotary clutch portion has a drive member with an interior clutch surface. The first and second rotary clutch portions are rotatably disposed about a rotary axis of the clutched device. The wrap spring has a first end, a second end opposite to the first end, and a plurality of helical coils that extend between the first and second ends. The first end is configured to transmit rotary power to the second rotary clutch portion. The helical coils are received against the interior clutch surface. The actuator is configured to selectively initiate coiling of the wrap spring to cause the helical coils of the wrap spring to disengage the interior clutch surface to a predetermined extent. The actuator includes an actuator input member, which is rotatable about the rotary axis, and a brake rotor. The actuator input member has a spring mount that engages the second end of the wrap spring. The actuator further includes a brake shoe that is movable in a radial direction to engage the brake rotor. The brake shoe includes a coil spring element that can be coiled and/or uncoiled to selectively apply a drag torque to the brake rotor.

The clutched driven device in accordance with the teachings of the fifth aspect of the present disclosure may further comprise a drum actuator that is rotatable to control coiling and uncoiling of the coil spring element.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIGS. 28 and 29 are side elevation views of a thirteenth driven accessory constructed in accordance with the teachings of the present disclosure in which FIG. 28 depicts the linear motor in a retracted condition and FIG. 29 depicts the linear motor in an extended condition;

Corresponding reference numerals indicate corresponding parts throughout the several views of the drawings.

DETAILED DESCRIPTION OF THE VARIOUS EMBODIMENTS

Figure 1:
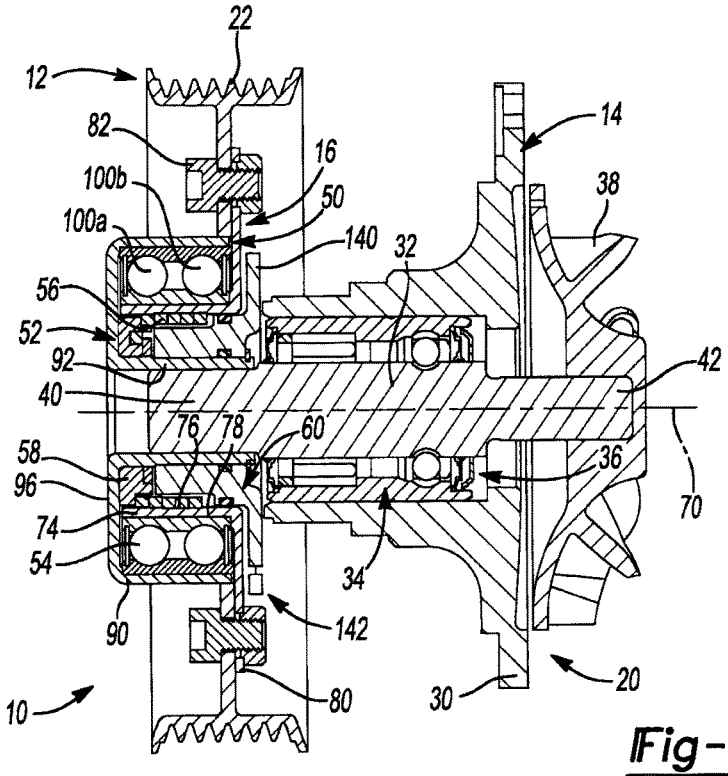
FIG. 1 is a longitudinal section view of a driven accessory constructed in accordance with the teachings of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
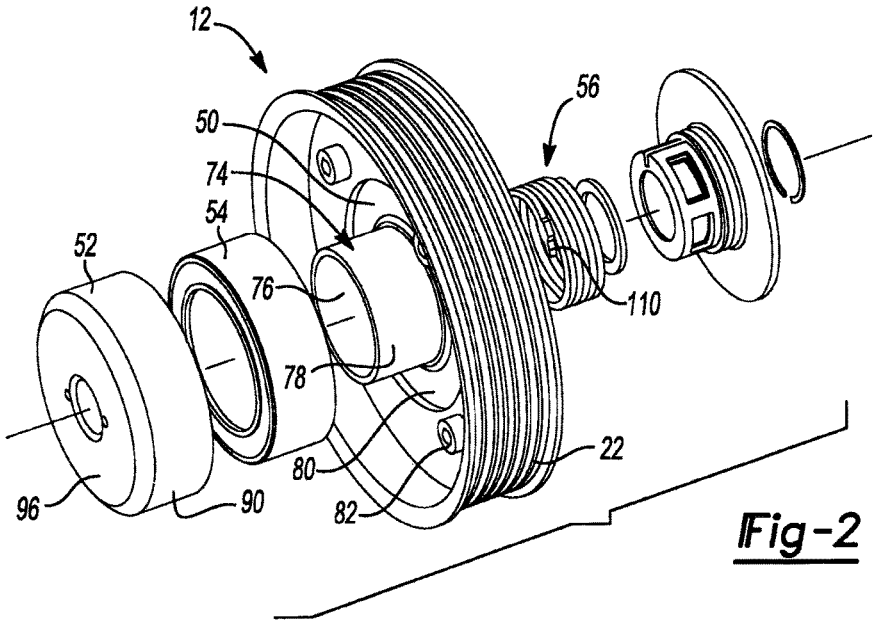
FIG. 2 is a front exploded perspective view of a portion of the driven accessory of FIG. 1.

With reference to FIGS. 1 and 2 of the drawings, a clutched driven device or accessory constructed in accordance with the teachings of the present disclosure is generally indicated by reference numeral 10. The clutched driven device 10 can comprise an input member 12, a substantially conventional accessory portion 14 and a clutch assembly 16. In the particular example provided, the accessory portion 14 is a water pump assembly 20, but those of skill in the art will appreciate that the depiction of a water pump assembly 20 is merely illustrative of one application of the present teachings and that the present teachings have application to various other types of engine accessories, such as fans, means for generating electricity (e.g., alternators, generators, starter-alternators, starter-generators), other types of pumps (e.g., air conditioning compressors, power steering pumps, vacuum pumps, air compressors), blowers, super chargers, power-take offs and accessories that are driven by other power sources, including motors (e.g., electrically-power or fluid-powered motors). Moreover, while the present teachings are depicted in an automotive or vehicle context, it will be appreciated that the teachings of the present disclosure have application to drive systems (i.e., systems for transferring motion, including systems that transfer rotary motion) generally.

The input member 12 can be configured to receive rotary power from an endless power transmitting member. Examples of various endless power transmitting members includes belts, chains, and gears. In the particular example provided, the input member 12 comprises a pulley sheave 22 that is configured to receive rotary power from a belt (not shown).

The water pump assembly 20 can include a housing 30, an input shaft 32, a bearing set 34, a seal system 36 and an impeller 38. The housing 30 can be configured to mount the clutched driven device 10 to a prime mover, such as an engine. The input shaft 32 can include an input end 40 and an output end 42 that is located opposite the input end 40. The bearing set 34 can be disposed between the housing 30 and the input shaft 32 and can support the input shaft 32 for rotation relative to the housing 30. The seal system 36 can comprise one or more sets of seals that are configured to inhibit ingress of contamination (e.g., dirt, debris, moisture) into the bearing set 34 and/or egress of lubrication from the bearing set 34. The impeller 38 can be fixedly coupled to the output end 42 of the input shaft 32 for rotation therewith.

Figure 3:
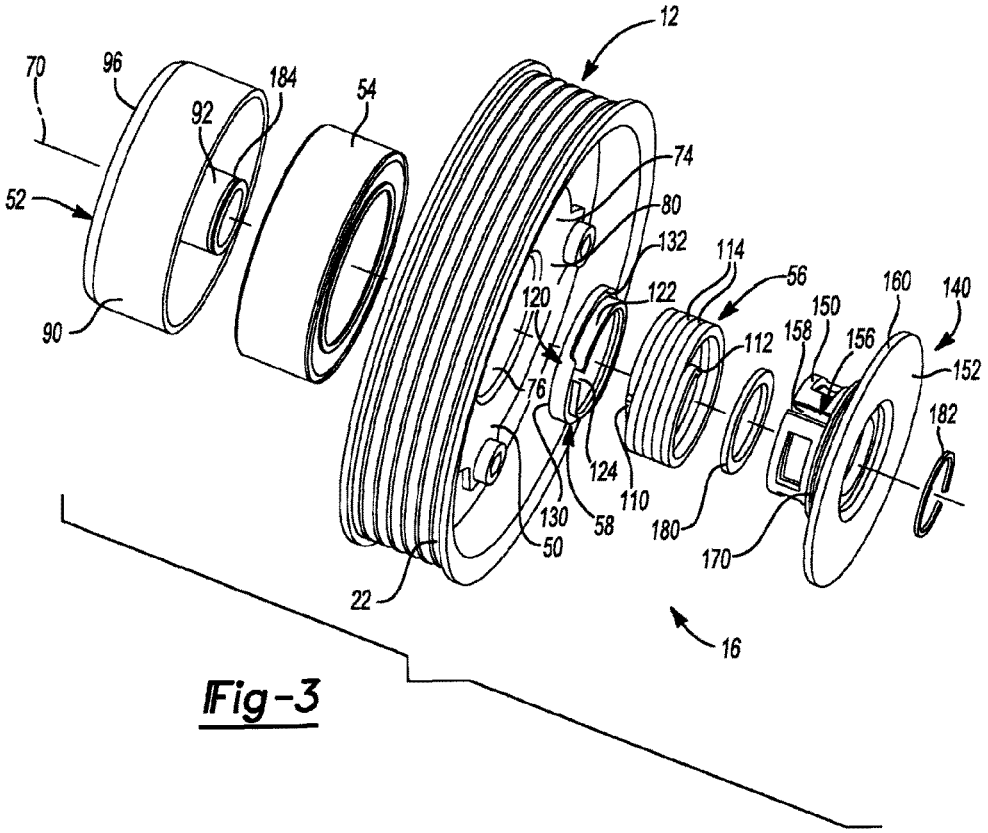
FIG. 3 is a rear exploded perspective view of a portion of the driven accessory of FIG. 1.

With reference to FIGS. 1 through 3, the clutch assembly 16 can comprise a first rotary clutch portion 50, a second rotary clutch portion 52, a bearing 54, a wrap spring 56, a carrier 58 and an actuator 60.

The first rotary clutch portion 50 can be configured to be coupled to the input member 12 for rotation therewith about a rotary axis 70. The first rotary clutch portion 50 can have a drive member 74 with an interior clutch surface 76. In the particular example provided, the first rotary clutch portion 50 comprises a tubular hub 78 and a radial flange 80 that is fixedly coupled to and extends radially outwardly from a rear end of tubular hub 78. The interior clutch surface 76 can be formed on an inside circumferential surface of the tubular hub 78 so that it is concentrically disposed about the rotary axis 70. The radial flange 80 can be fixedly coupled to the input member 12 in any desired manner, such as welds or threaded fasteners 82. As another example, the radial flange 80 can be integrally and unitarily formed with the input member 12 (i.e., as a one-piece component).

The second rotary clutch portion 52 can be configured to transmit rotary power to the input shaft 32 of the water pump assembly 20. In the particular example provided, the second rotary clutch portion 52 comprises an outer annular wall 90, an inner annular wall 92, at least one drive lug 94 (FIG. 4) and an end wall 96 that connects the outer and inner annular walls 90 and 92 to one another. The outer annular wall 90 can be disposed concentrically about the tubular hub 78 of the first rotary clutch portion 50, while the inner annular wall 92 can be disposed concentrically within the tubular hub 78. The inner annular wall 92 can be non-rotatably coupled to the input end 40 of the input shaft 32 in any desired manner, such as an interference fit, a weld, spline teeth and/or a threaded fastener. The drive lug(s) 94 can be coupled to one or more of the outer annular wall 90, the inner annular wall 92 and the end wall 96 for rotation therewith. In the particular example provided, the drive lugs 94 are co-formed with the inner annular wall 92 and the end wall 96 but it will be appreciated, however, that the drive lugs 94 could be formed on another structure, such as a thrust washer, that is assembled to (and non-rotatably coupled to) one or more of the outer annular wall 90, the inner annular wall 92 and the end wall 96.

The bearing 54 can be received between the first and second rotary clutch portions 50 and 52 and can support the first rotary clutch portion 50 for rotation about the second rotary clutch portion 52. In the example provided, the bearing 54 is engaged to a radially inside surface of the outer annular wall 90 and a radially outside surface of the tubular hub 78. The bearing 54 can be any type of bearing, but in the example provided is a sealed bearing having two rows of bearing elements 100a, 100b that are spaced axially apart from one another along the rotary axis 70.

Figure 5:
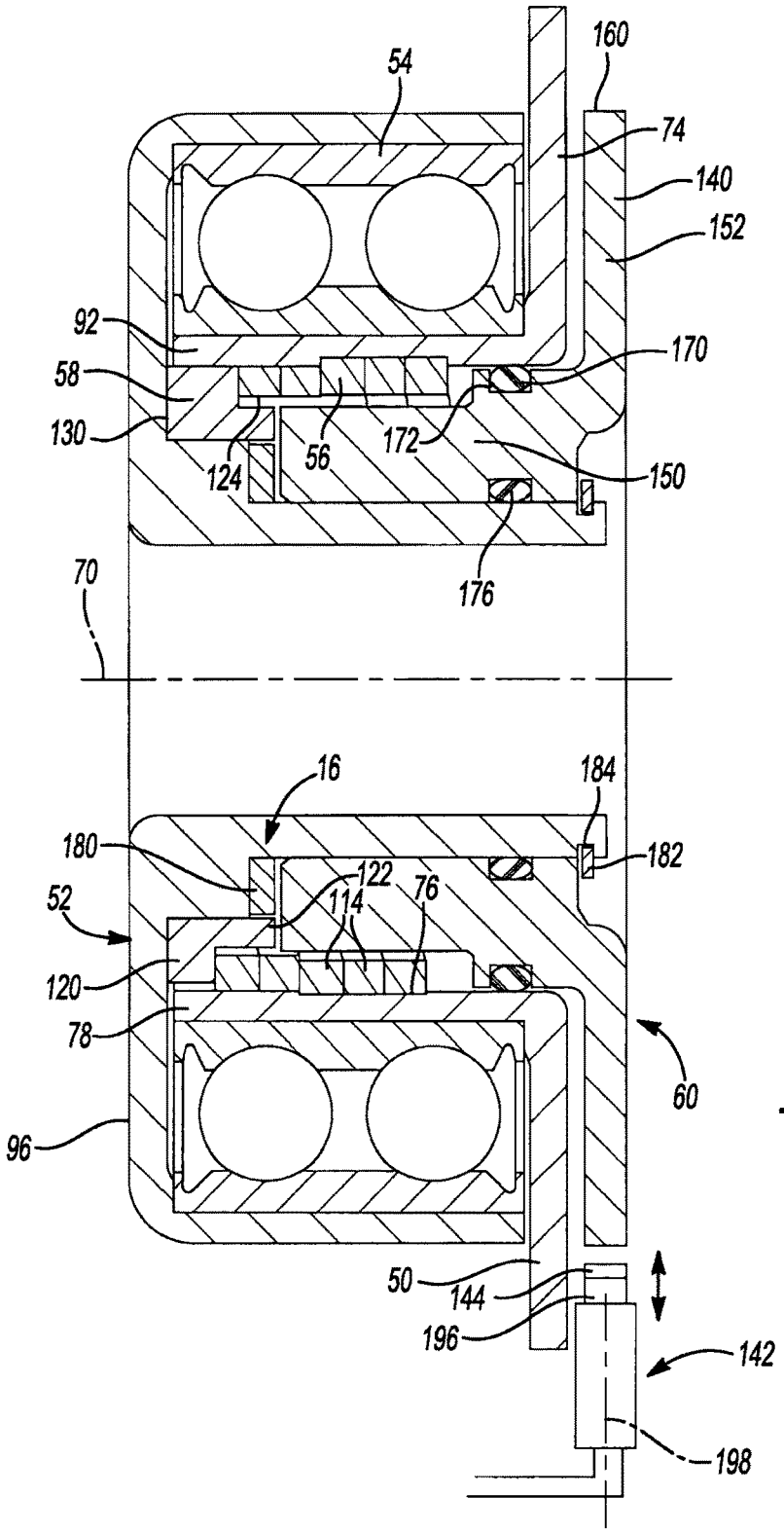
FIG. 5 is a longitudinal section view of a portion of the driven accessory of FIG. 1.
Figure 6:
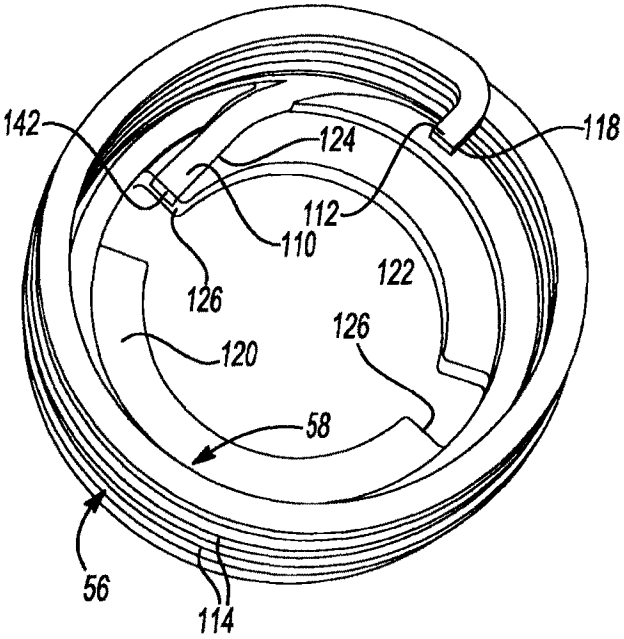
FIG. 6 is a rear perspective view of a portion of the driven accessory of FIG. 1 illustrating a wrap spring and a carrier in more detail.

With reference to FIGS. 3, 5 and 6, the wrap spring 56 can be formed of an appropriate wire, which can have a generally square or rectangular cross-sectional shape. The wire that forms the wrap spring 56 can be uncoated (i.e., plain) or could be coated with a suitable material that can, for example, help to control friction, wear, and/or heat. The wrap spring 56 can be disposed radially inwardly of the bearing 54 and can have a first end 110, a second end 112 that is opposite to the first end 110, and a plurality of helical coils 114 that can extend between the first and second ends 110 and 112. The helical coils 114 can be received against the interior clutch surface 76. In the particular example provided, the helical coils 114 are press-fit to the interior clutch surface 76 but it will be appreciated that other types of fits may be employed in the alternative. Moreover, it will be appreciated that all of the helical coils 114 need not be fitted to the interior clutch surface 76 in the same manner. For example, some of the helical coils 114 may employ an interference, while there may clearance or varying levels of interference between the remaining helical coils an the interior clutch surface 76. The first end 110 can be configured to transmit rotary power from the helical coils 114 to the second rotary clutch portion 52 as will be discussed in more detail, below. The second end 112 can include a control tang 118 that can be coupled to the actuator 60 as will be discussed in more detail below.

Figure 4:
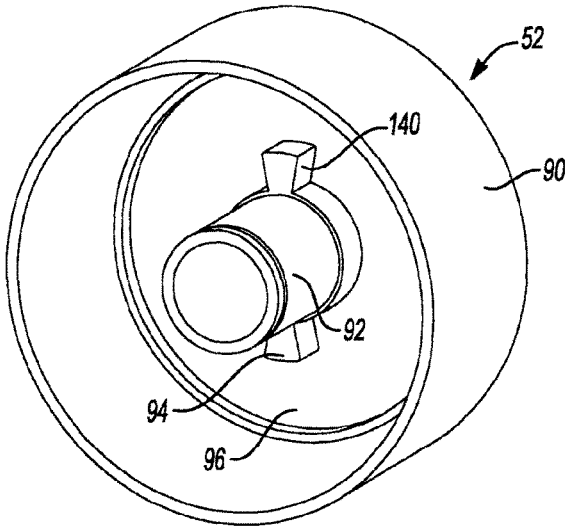
FIG. 4 is a perspective view of a portion of the driven accessory of FIG. 1 illustrating a second rotary clutch portion in more detail.

The carrier 58 can be formed of a suitable material, such as steel or plastic, and can comprise a flange portion 120, a sleeve portion 122, a groove 124 and a carrier abutment wall 126. The flange portion 120 can be an annular structure having a front surface 130, which can abut the end wall 96 of the second rotary clutch portion 52, and a rear surface 132 that can abut the adjacent one of the helical coils 114 of the wrap spring 56. In the example provided, portion of the rear surface 132 that abuts the wrap spring 56 is helically shaped to match the contour of the helical coils 114 of the wrap spring 56. The sleeve portion 122 can be an annular structure that can extend axially from the flange portion 120. The sleeve portion 122 can be sized to be received in the helical coils 114 of the wrap spring 56 to support one or more of the helical coils 114 and/or to maintain the carrier 58 and the first end 110 of the wrap spring 56 about the rotary axis 70. The groove 124 can be configured to receive the first end 110 of the wrap spring 56 and can extend through the circumference of the sleeve portion 122 and optionally through the carrier abutment wall 126. The carrier abutment wall 126 can abut an abutting face 140 (FIG. 4) on one of the drive lugs 94 on the second rotary clutch portion 52 and if the groove 124 extends through the carrier abutment wall 126 (as is shown in the example provided), an axial end face 142 of the wire that forms the wrap spring 56 can also abut the abutting face 140 (FIG. 4) on the one of the drive lugs 94 (FIG. 4).

With reference to FIGS. 1, 3 and 5, the wrap spring 56 can be wound such that the helical coils 114 tend to uncoil or expand radially outwardly when rotary power is transmitted through the clutch assembly 16. More specifically, rotation of the input member 12 can cause corresponding rotation of the drive member 74, which in turn can tend to rotate the wrap spring 56 due to engagement of the helical coils 114 with the interior clutch surface 76. Rotary power input to the wrap spring 56 can be transmitted to the second rotary clutch portion 52 (via the first end 110 of the wrap spring 56 and/or the carrier 58), which will tend to rotate the input shaft 32 of the accessory portion 14. Because the input shaft 32 of the accessory portion 14 does not spin without resistance (rotation of the input shaft 32 permits the accessory portion 14 to produce work), the helical coils 114 of the wrap spring 56 tend to uncoil or expand radially outwardly to better grip the interior clutch surface 76. Accordingly, this example of the clutch assembly 16 is self-activating.

With reference to FIGS. 1, 3 and 5, the actuator 60 can be configured to selectively initiate coiling of the wrap spring 56 to cause the helical coils 114 to at least partly disengage the interior clutch surface 76. More specifically, actuation of the actuator 60 can pull on the second end 112 of the wrap spring 56 to cause one or more of the helical coils 114 to coil more tightly or contract radially inwardly. In the example provided, the actuator 60 comprises an actuator input member 140, a drive motor 142 and a brake shoe 144.

The actuator input member 140 can comprise a hub member 150 and a brake rotor 152. The hub member 150 can be a tubular structure that can be received between the inner annular wall 92 of the second rotary clutch portion 52 and the tubular hub 78. The hub member 150 can have a spring mount 156 that can engage the second end 112 of the wrap spring 56. In the present example, the spring mount 156 comprises a longitudinally extending slot 158 that is formed in the hub member 150. The tang 118 (FIG. 6) on the second end 112 of the wrap spring 56, which can extend radially inwardly from an adjacent one of the helical coils 114, can be received into the slot 158 so that rotation of the actuator input member 140 in a predetermined direction relative to the second end 112 of the wrap spring 56 causes coiling of the helical coils 114. The brake rotor 152 can be an annular structure that can be coupled to the hub member 150 extend radially outwardly therefrom. The brake rotor 152 can have a rotor surface 160.

The actuator input member 140 can be configured to rotate about the rotary axis 70 substantially with the first rotary clutch portion 50 such that the actuator input member 140 rotates with or lags slightly behind the first rotary clutch portion 50 as will be discussed in more detail below. Any desired means may be employed to couple the actuator input member 140 to the first rotary clutch portion 50 in a way that permits limited rotation of the actuator input member 140 relative to the first rotary clutch portion 50. For example, receipt of the tang 118 (FIG. 6) on the second end 112 of the wrap spring 56 into the slot 158 can provide sufficient rotational coupling of the actuator input member 140 to the first rotary clutch portion 50 to cause the actuator input member 140 to substantially rotate with the first rotary clutch portion 50. In the particular example provided, however, a frictional interface is provided between the first rotary clutch portion 50 and the actuator input member 140 that creates a drag force that tends to drive the actuator input member 140 as the first rotary clutch portion 50 rotates, as well as helps to "energize" the helical coils 114 so that they uncoil/expand radially to further engage the interior clutch surface 76. In the particular example provided, an O-ring seal 170, which is received in a seal groove 172 formed in the hub member 150, frictionally engages both the first rotary clutch portion 50 and the hub member 150. If desired, one or more seals may be employed to seal the cavity between the first and second rotary clutch portions 50 and 52 into which the wrap spring 56 is disposed. In the particular example provided, a second O-ring seal 176 seals an interface between the inner annular wall 92 of the second rotary clutch portion 52 and the hub member 150, while the O-ring seal 170 seals an interface between the hub member 150 and the tubular hub 78. It will be appreciated that any desired type of seal may be employed for one or both of the O-ring seals 170 and 176, such as a quad ring seal, an X ring seal, a lip seal, a dynamic seal, an overmold, etc. If desired, a suitable lubricant, such as a coating, a dry-film lubricant, a grease, oil and/or a traction fluid, can be employed to lubricate the helical coils 114 and the interior clutch surface 76.

To control axial endplay of the actuator input member 140 relative to the second rotary clutch portion 52 and/or to retain the carrier 58 and provide axial clamping force on the carrier 58 and the first end 110 of the wrap spring 56, various endplay control techniques can be employed. For example, a thrust ring 180 can be disposed between the second rotary clutch portion 52 and a front axial surface of the actuator input member 140 and a retaining ring 182, which can be received in a ring groove 184 in the second rotary clutch portion 52, can limit movement of the actuator input member 140 in an axial direction away from the end wall 96.

The drive motor 142 can be mounted to the housing 30 (FIG. 1) of the accessory portion 14 (FIG. 1) and can be configured to selectively drive the brake shoe 144 into frictional engagement with the rotor surface 160 of the brake rotor 152. In the example provided, the drive motor 142 is a linear motor, such as an electrically powered solenoid, but it will be appreciated that other types of drive motors (or linear motors) could be employed in the alternative, including cylinders. Also in the example provided the drive motor 142 has an output member 196 that is configured to translate along an actuator axis 198 that is oriented perpendicular to the rotary axis 70.

It will be appreciated that the drive motor 142 can be operated to drive the brake shoe 144 into contact with the rotor surface 160 of the brake rotor 152 to generate drag (i.e., a friction force) that causes the actuator input member 140 to rotate relative to the first rotary clutch portion 50 such that the tang 118 (FIG. 6) of the second end 112 of the wrap spring 56 is pulled in a rotational direction that causes one or more of the helical coils 114 to coil or contract radially inwardly such that the wrap spring 56 disengages the interior clutch surface 76 to a predetermined extent. In the present example, contact between the brake shoe 144 and the rotor surface 160 is configured to cause relative rotation of the brake rotor 152 relative to the first rotary clutch portion 50 through a limited angular offset while the brake rotor 152 continues to rotate with the first rotary clutch portion 50 (albeit in a slightly lagging behind condition defined by the angular offset). It will be appreciated, however, that if desired, contact between the brake shoe 144 and the rotor surface 160 could halt rotation of the brake rotor 152 such that the brake rotor 152 is maintained in a stationary or non-rotating condition while the first rotary clutch portion 50 rotates.

The brake shoe 144 can be mounted to the output member 196 of the drive motor 142 for translation therewith. In the example provided, the brake shoe 144 is depicted as a pad, but it will be appreciated that the brake shoe 144 could comprise other structures, such as a friction roller that is rotatably mounted to the output member 196, or could be co-formed with the output member 196.

While the clutch assembly 16 has been illustrated and described as employing a linear motor that is oriented generally perpendicular to a rotational axis of a brake rotor and a brake shoe that contacts a portion of a circumferentially extending surface of the brake rotor, it will be appreciated that a driven accessory constructed in accordance with the teachings of the present disclosure may be constructed somewhat differently.

Figure 7:
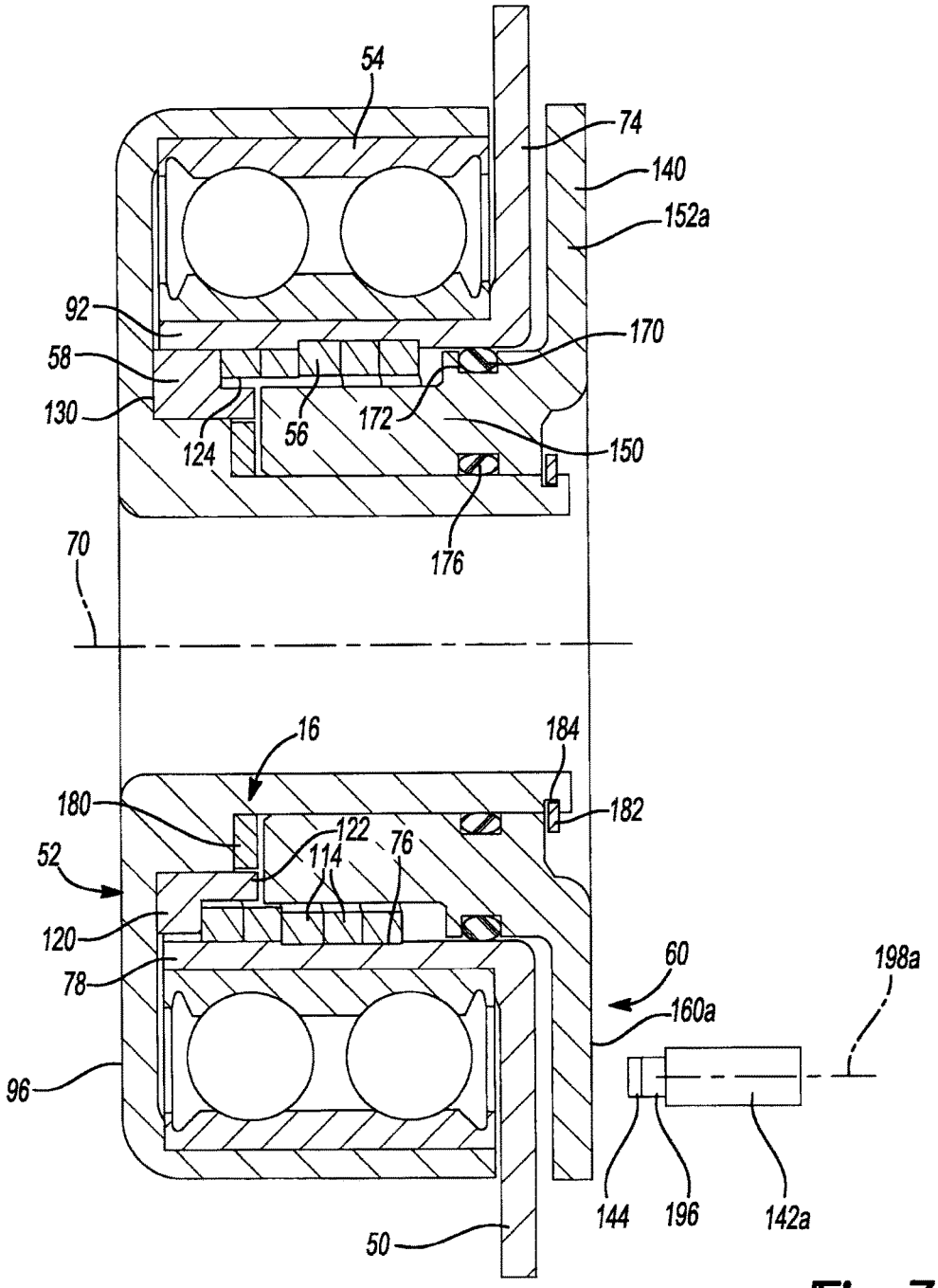
FIG. 7 is a longitudinal section view of a second driven accessory constructed in accordance with the teachings of the present disclosure.
Figure 9:
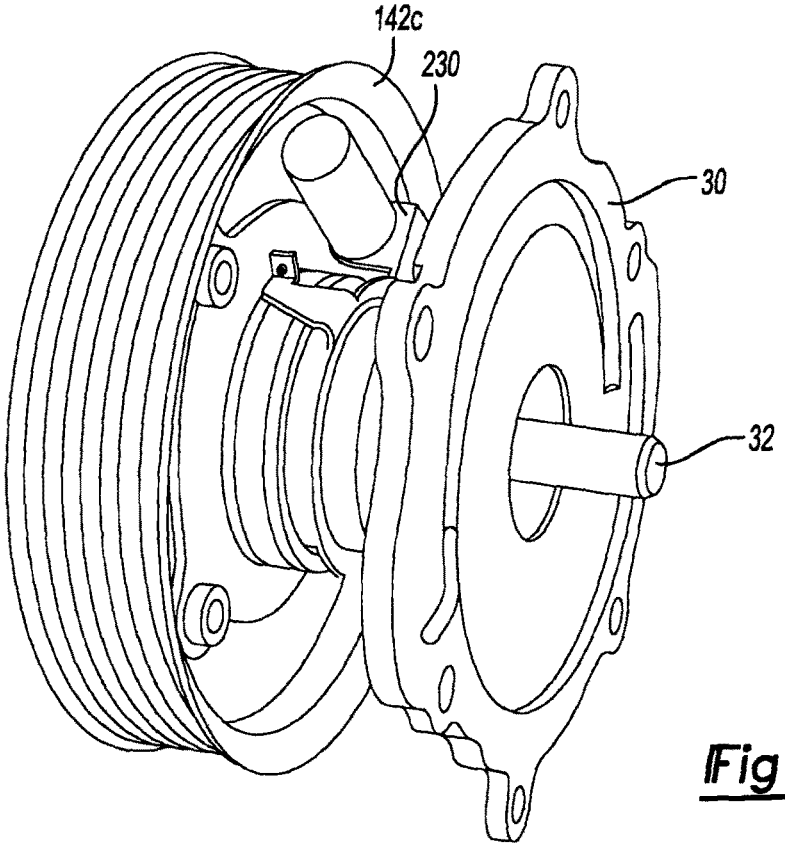
FIG. 9 is a rear perspective view of a fourth driven accessory constructed in accordance with the teachings of the present disclosure.
Figure 10:
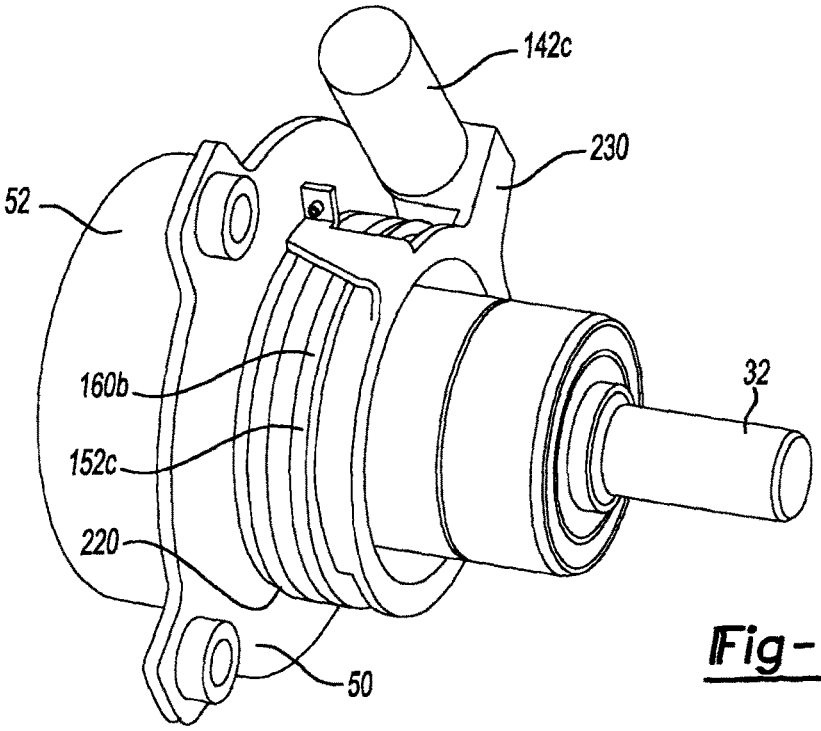
FIG. 10 is a rear perspective view of a portion of the driven accessory of FIG. 9.
Figure 11:
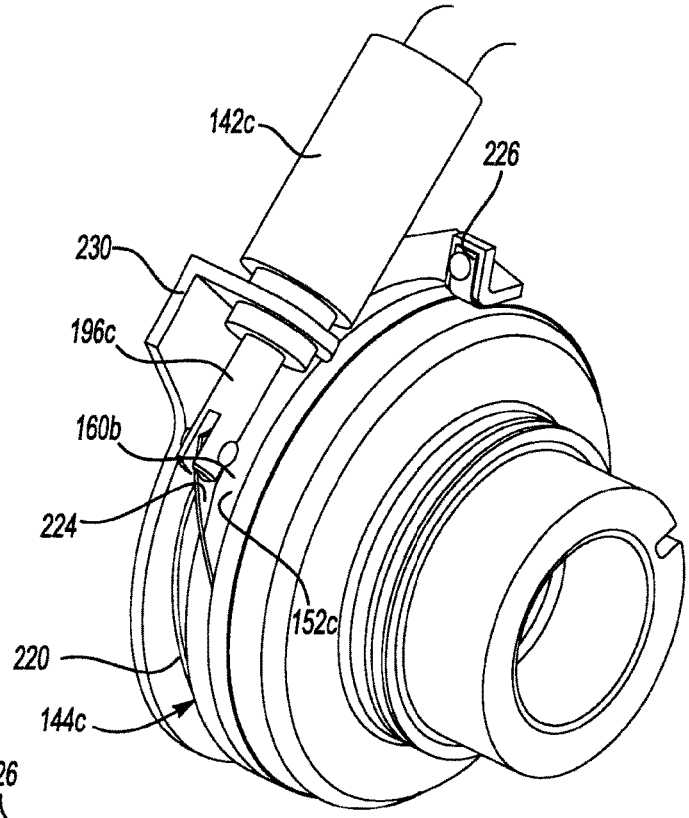
FIG. 11 is a front perspective view of a portion of the driven accessory of FIG. 9.
Figure 12:
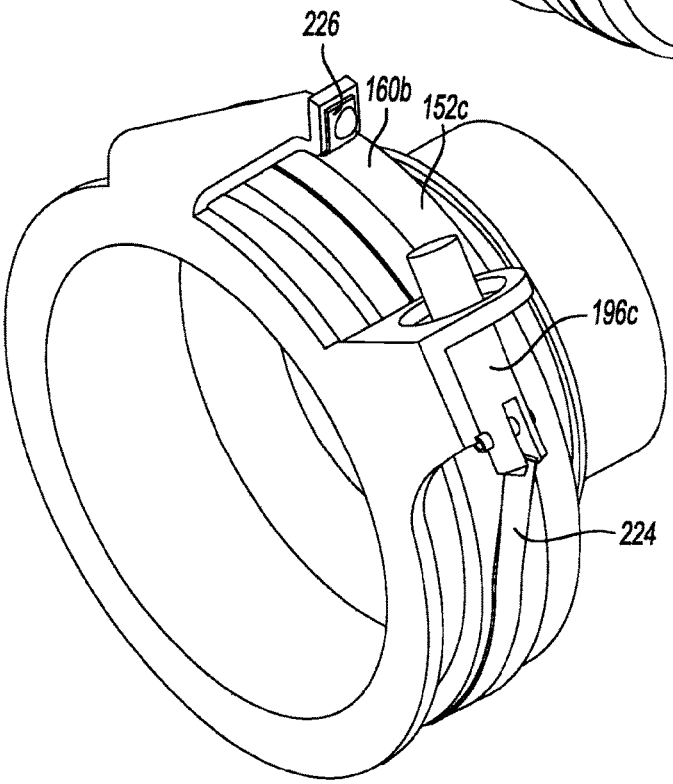
FIG. 12 is rear perspective view of a portion of the driven accessory of FIG. 9.

For example, the drive motor 142a can be oriented such that the actuator axis 198a is parallel to the rotary axis 70 as is shown in FIG. 7. In this example, the rotor surface 160a is formed on a radially extending surface of the brake rotor 152a rather than on a circumferentially extending surface as in the example of FIGS. 1 through 6.

Figure 8:
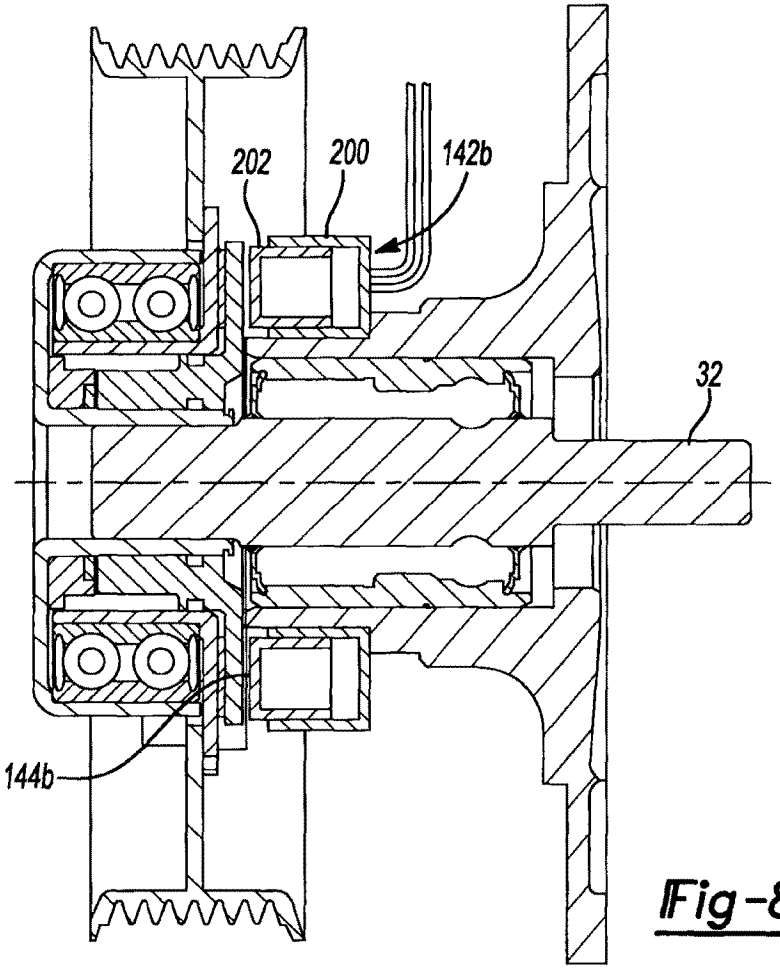
FIG. 8 is a longitudinal section view of a third driven accessory constructed in accordance with the teachings of the present disclosure.

The example of FIG. 8 is generally similar to that of FIG. 7, except that the drive motor 142b comprises an annular cylinder 200 that is disposed concentrically about the input shaft 32 and has a piston 202 that is powered by a pressurized fluid, such as air, water or oil to translate the piston 202 along an actuator axis that is coincident with the rotational axis of the input shaft 32. A source of pressurized fluid could be communicated to the interior of the annular cylinder 200 to cause movement of the piston 202, or in the alternative, that fluid could be withdrawn from the cylinder 200 to create a pressure differential that causes ambient air pressure to move the piston 202. It will be appreciated that the piston 202 can be non-rotatably housed in the annular cylinder 200, and that the brake shoe 144b could be mounted to or integrally formed with the annular end face of the piston 202.

Various cylinder or cylinder-like devices could be substituted for the particular cylinder that is illustrated in FIG. 8 and described above. For example, the cylinder 200 need not have an annular configuration and that in such case, the cylinder could be mounted such that the longitudinal axis of the cylinder is offset from but parallel to the rotational axis of the clutched driven device 10b. As another example, the cylinder could have a "pneumatic muscle" configuration in which changes in the pressure of the working fluid in the cylinder can contract or elongate the cylinder in a predefined manner.

Another example is illustrated in FIGS. 9 through 12 where the brake shoe 144c comprises a band 220 that is wrapped at least partly about the circumference of the brake rotor 152c. In this example, a first end 224 of the band 220 is coupled to the output member 196c of the drive motor 142c, while a second, opposite end 226 of the band 220 is fixedly coupled to a bracket 230 that is employed to mount the drive motor 142c to the housing 30 (FIG. 1). It will be appreciated that operation of the drive motor 142c moves the output member 196c such that the band 220 is tightened about the rotor surface 160b of the brake rotor 152c.

Figure 13:
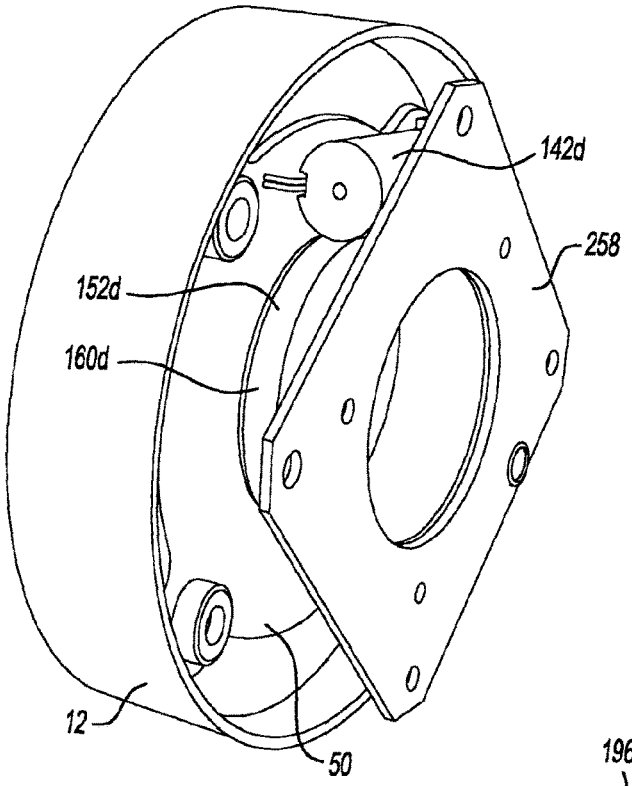
FIG. 13 is a rear perspective view of a fifth driven accessory constructed in accordance with the teachings of the present disclosure.
Figure 14:
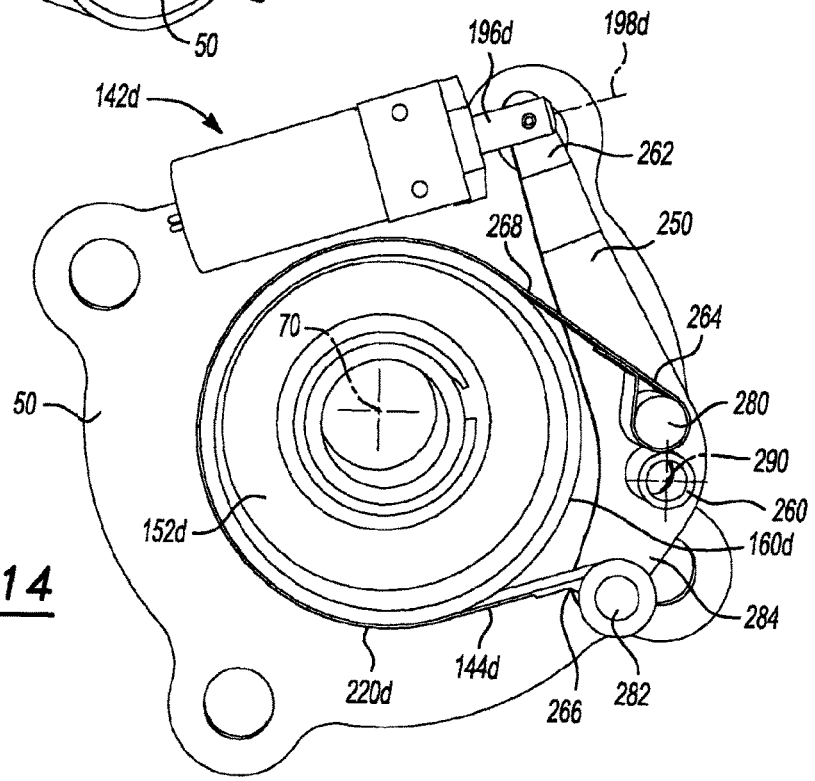
FIG. 14 is a lateral section view illustrating the driven accessory of FIG. 13 in more detail.
Figure 15:
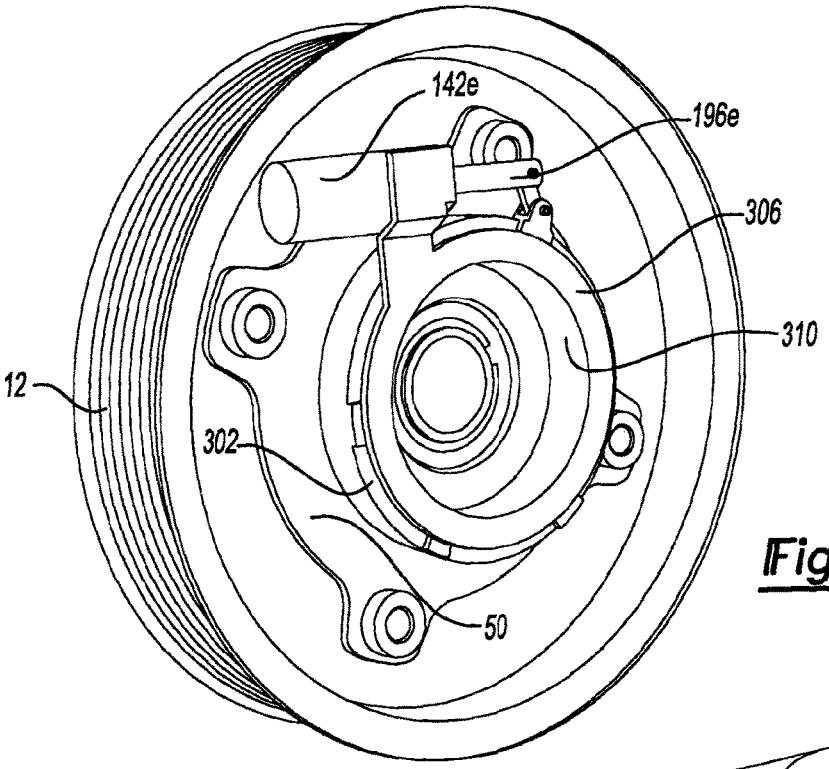
FIG. 15 is a rear perspective view of a sixth driven accessory constructed in accordance with the teachings of the present disclosure.
Figure 16:
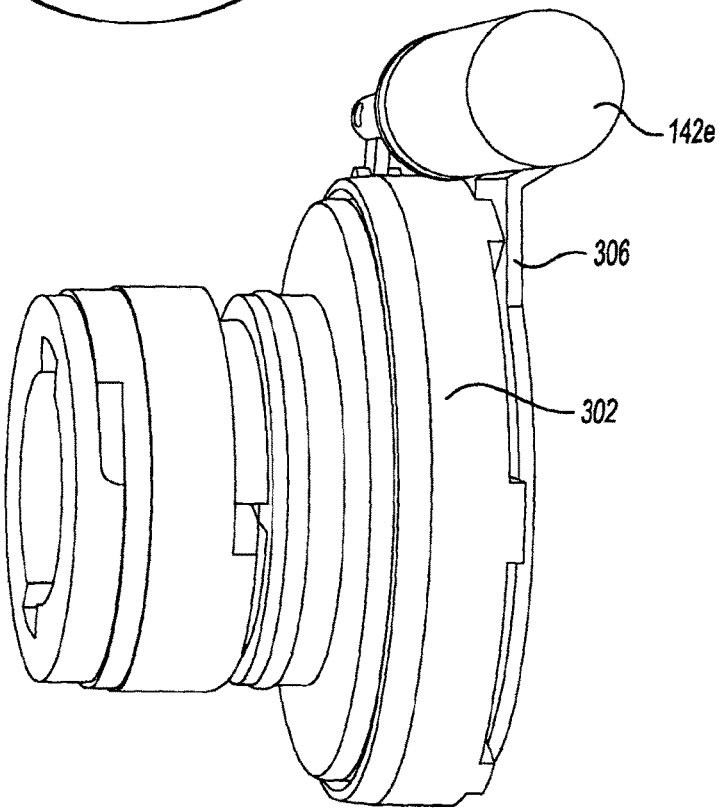
FIG. 16 is a right side perspective view of a portion of the driven accessory of FIG. 15.
Figure 17:
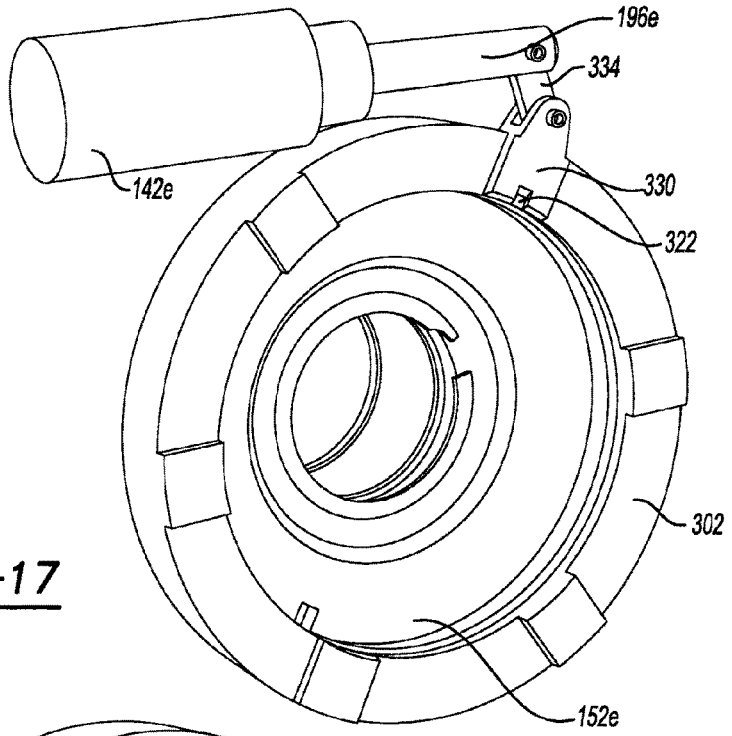
FIG. 17 is a rear perspective view of a portion of the driven accessory of FIG. 15.
Figure 18:
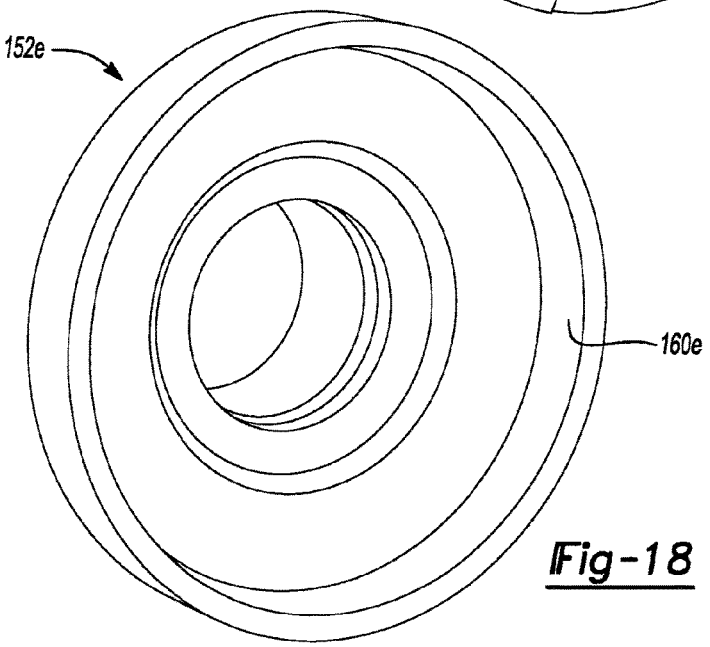
FIG. 18 is a rear perspective view of a portion of the driven accessory of FIG. 15.
Figure 19:
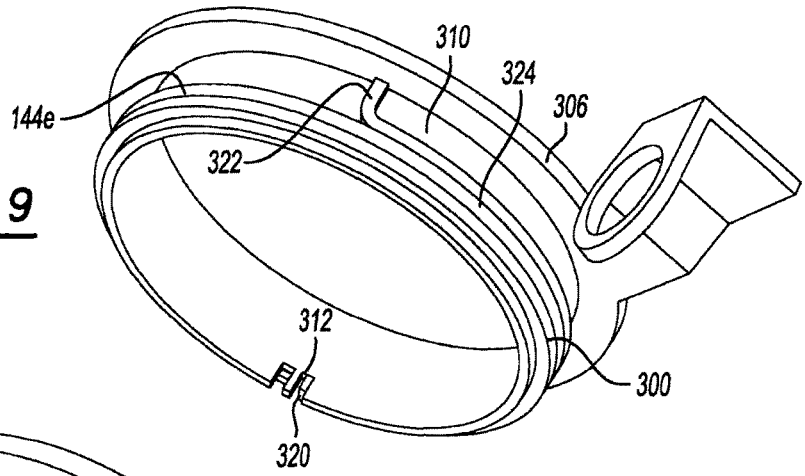
FIG. 19 is a top perspective view of a portion of the driven accessory of FIG. 15.
Figure 20:
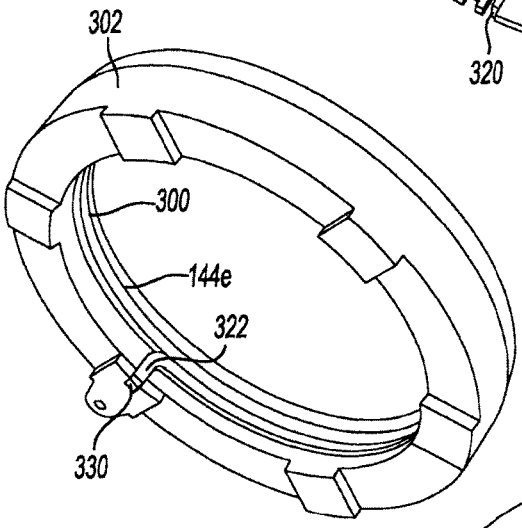
FIG. 20 is a bottom perspective view of a portion of the driven accessory of FIG. 15.
Figure 21:
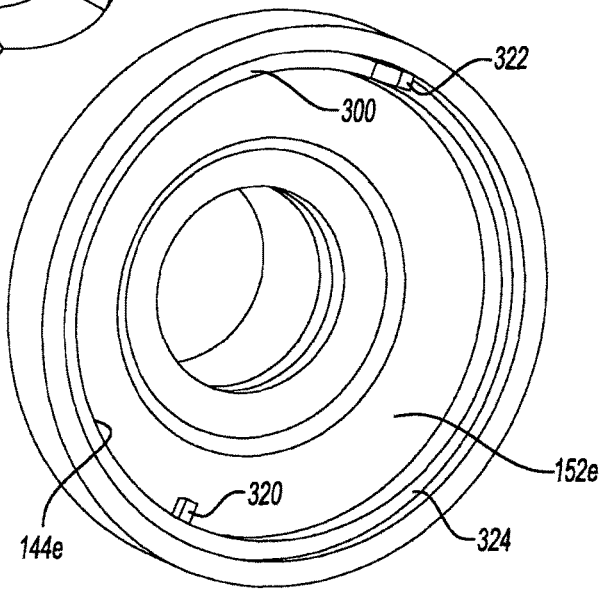
FIG. 21 is a rear perspective view of a portion of the driven accessory of FIG. 15.

Still another example is illustrated in FIGS. 13 and 14 where the brake shoe 144d comprises a band 220d, the drive motor 142d is mounted such that the actuator axis 198d is transverse to the rotational axis 70 of the driven accessory, and a pivot arm 250 couples the output member 196d of the drive motor 142d to the band 220d. In the example provided, the drive motor 142d is fixedly mounted to a bracket 258, and the pivot arm 250 is pivotally mounted to the bracket 258 via a pivot pin 260. The output member 196d of the drive motor 142d can be pivotally coupled to a first end 262 of the pivot arm 250. The band 220d can have first and second attachment portions 264 and 266, respectively, and a band body 268 that can be wrapped about the rotor surface 160d of the brake rotor 152d. It will be appreciated that the band 220d can be coupled to the pivot arm 250 in any desired manner that permits the band 220d to tighten and frictionally engage the rotor surface 160d when the drive motor 142d is in one operational state (e.g., powered or operated) and frictionally disengaged from the rotor surface 160d when the drive motor 142d is in a second operational state (e.g., unpowered or not operated). For example, one of the first and second attachment portions 264 and 266 could be coupled to the pivot arm 250 for movement therewith while the other one of the first and second attachment portions 264 and 266 could be coupled to the bracket 258 such that pivoting of the pivot arm 250 about the pivot pin 260 causes the band 220d to frictionally engage and disengage the rotor surface 160d. Alternatively, both the first and second attachment portions 264 and 266 can be coupled to the pivot arm 250. In the example provided, the first attachment portion 264 is coupled via a pin 280 to the pivot arm 250 at a first location between the pivot pin 260 and the first end 262, while the second attachment portion 266 is coupled to the pivot arm 250 via a pin 282 at a second location between the pivot pin 260 and a second end 284 that is opposite the first end 262. The second location is spaced further from a pivot axis 290 (defined by the pivot pin 260) than the first location to multiply the amount by which so that the first location will move relative to the pivot pin 260 by an amount that is greater than the amount by which the second location will move relative to the pivot pin 260 so that the band 220d can be engaged to the rotor surface 160d.

A further example is illustrated in FIGS. 15-21 in which the brake shoe 144e is a brake spring 300 that can be selectively engaged to a drum actuator 302 by the drive motor 142e. The drive motor 142e can be mounted to a bracket 306 that can be fixedly coupled to a non-rotating structure, such as the housing 30 (FIG. 1). The bracket 306 can have a tubular hub 310 that can define a first tang slot 312. The brake spring 300 include a first tang 320, a second tang 322 and a plurality of helical coils 324 between the first and second tangs 320 and 322. The first tang 320 can extend from the helical coils 324 in a radially inward direction, while the second tang 322 can extend from the helical coils 324 in an axial direction. The brake spring 300 can be received over the tubular hub 310 and the first tang 320 can be received in the first tang slot 312. The drum actuator 302 can be an annular structure into which the brake spring 300 can be received (i.e., such that the helical coils 324 of the brake spring 300 are received between the drum actuator 302 and the tubular hub 310. The drum actuator 302 can define a second tang slot 330 into which the second tang 322 can be received. Accordingly, it will be appreciated that rotation of the drum actuator 302 relative to the bracket 306 will cause the helical coils 324 of the drum spring 300 to expand radially outwardly (i.e., uncoil) or contract radially inwardly (i.e., coil more tightly). Any desired means may be employed to transmit motion from the drive motor 142e to the drum actuator 302 but in the particular example provided, the output member 198e of the drive motor 142e is coupled to the drum actuator 302 via a linkage 334. The brake rotor 152e can be received between the helical coils 324 such that the rotor surface 160e extends circumferentially about the helical coils 324. It will be appreciated that operation of the drive motor 142e to rotate the drum actuator 302 in a first direction relative to the bracket 306 can expand or uncoil the helical coils 324 such that they frictionally engage the rotor surface 160e, while rotation of the drum rotor 302 in a second, opposite direction relative to the bracket 306 can contract or coil the helical coils 324 such that they do not frictionally engage the rotor surface 160e.

While the driven accessories have been described above as employing a clutch assembly with a linear motor that comprises a solenoid and an armature or output member, it will be appreciated that the linear motor could be configured somewhat differently. For example, FIGS. 22 and 23 illustrate portions of driven accessories that are generally similar to those of FIGS. 14 and 11 except for the configuration of the linear motor.

Figure 22:
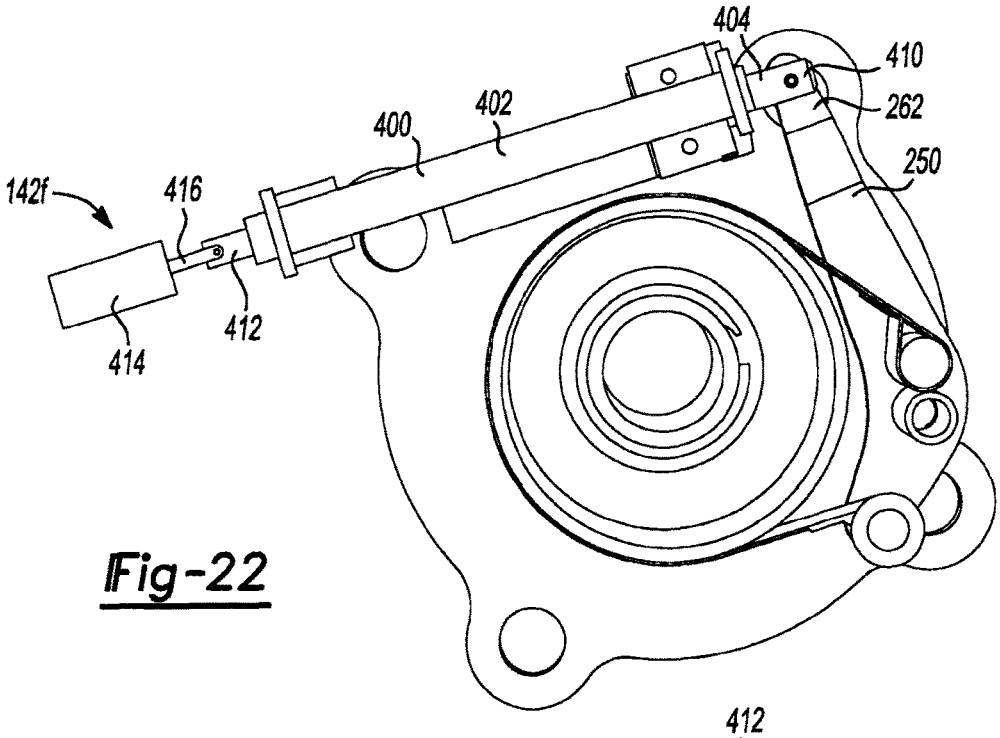
FIG. 22 is a section view illustrating a portion of a seventh driven accessory constructed in accordance with the teachings of the present disclosure.

In FIG. 22, the drive motor 142f comprises Bowden cable 400 having an outer sleeve 402, which is mounted in a stationary manner relative to the housing 30 (FIG. 1), and a cable 404 that is slidingly received within the outer sleeve 402. A first end 410 of the cable 404 can be coupled to the first end 262 of the pivot arm 250, while a second, opposite end 412 of the cable 404 can be coupled to a rotary motor 414 that is configured to drive the cable 404 relative to the outer sleeve 402. In this example, the motor 414 comprises a device with an axially movable output member 416 that is coupled to the second end 112 of the cable 404. If desired, a spring can be employed to bias the cable 404 into a desired position.

Figure 23:
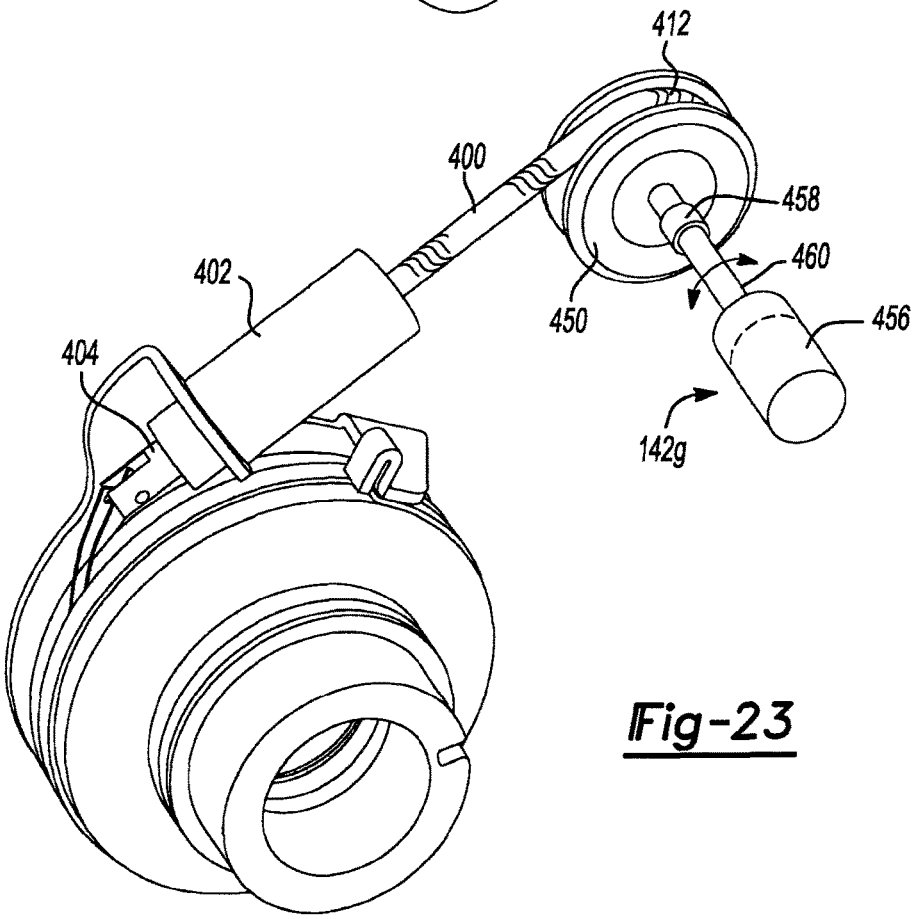
FIG. 23 is a front perspective view illustrating a portion of an eighth driven accessory constructed in accordance with the teachings of the present disclosure.

In FIG. 23, the drive motor 142g also comprises a Bowden cable 400, but the second end 412 of the cable 404 is mounted or wrapped about a control rotor 450 whose rotational position relative to a stationary object (e.g., the housing 30 (FIG. 1) is controlled by a motor 456 having a rotary output. The motor 456 could be a stepper motor that could be configured to directly rotate the control rotor 450, but in the particular example provided, the motor 456 comprises a relatively small, high speed, low torque motor that drives a transmission 458 through a flexible cable 460. The transmission 458 can have any desired reduction drive for transmitting rotary power to the control rotor 450. In the example provided, the transmission 458 comprises a worm drive that outputs rotary power to the control rotor 450.

Figure 24:
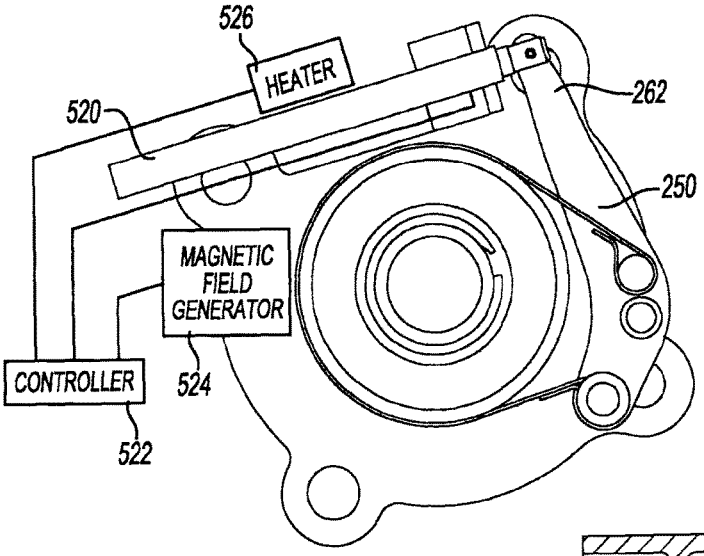
FIG. 24 is a section view illustrating a portion of a ninth driven accessory constructed in accordance with the teachings of the present disclosure.

The example of FIG. 24 is generally similar to that of FIG. 22 except that the linear motor 520 is schematically illustrated and can be formed of a material that changes its shape and/or length when exposed to an electronic or magnetic signal. The material could be a shape metal material, a bimetallic material (e.g., bimetallic strip), an electrostrictive material or a magnetostrictive material. A controller 522 could be employed to produce an electronic signal and/or to control a magnetic field generator 524 to produce a magnetic field and/or to control a heater 526 to produce heat that is suited for controlling the shape and/or length of the material.

Figure 25:
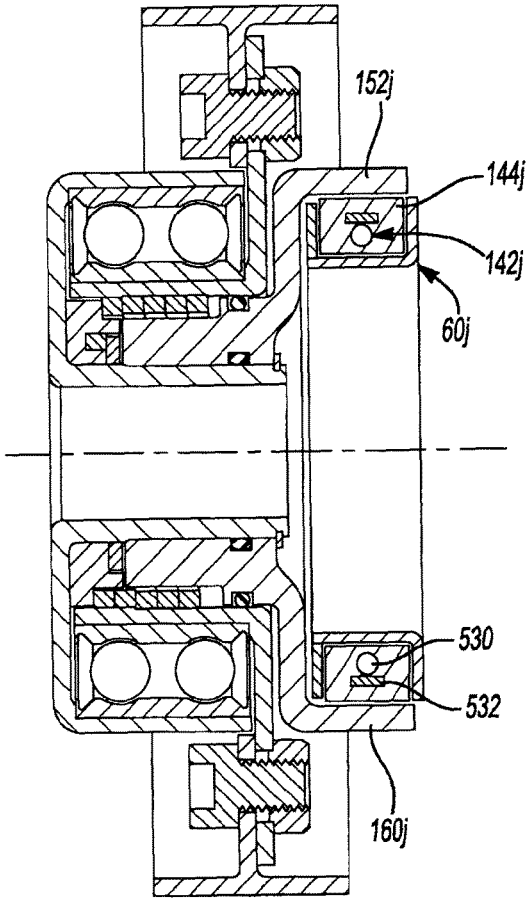
FIG. 25 is a longitudinal cross section illustrating a portion of a tenth driven accessory constructed in accordance with the teachings of the present disclosure.

In the example of FIG. 25, the drive motor 142j and the brake shoe 144j of the actuator 60j are received into the brake rotor 152j. The brake shoe 144j can be formed of a suitable plastic and can have an annular shape with a split formed radially through one side (such that the brake shoe 144j is C-shaped). The drive motor 142j, which comprises a heater 530, which could be a wire heating element, and an element 532 formed of a shape memory material or a bi-metallic material, can be encapsulated into the brake shoe 144j and non-rotatably mounted to the water pump assembly 20 (FIG. 1).

Operation of the heater 530 can cause the element 532 to deflect radially outwardly to drive the brake shoe 144j into engagement with the rotor surface 160j of the brake rotor 152j. It will be appreciated that the drag force produced by contact between the brake shoe 144j and the rotor surface 160j can cause the clutch assembly 16j to halt the transmission of rotary power between the input member 12 and the input shaft 32 (FIG. 1) in a manner that is similar to that which is described in detail above. The element 532 itself and/or a resilient characteristic of the material that forms the brake shoe 144j can act as a return spring to cause the brake shoe 144j to disengage the rotor surface 160j when the element 532 has cooled.

While the drive motor 142j and the brake shoe 144j of the actuator 60j have been illustrated and described as being configured to cooperate with the brake rotor 152j to create a drag force on a circumferentially extending interior surface of the brake rotor 152j, it will be appreciated that the drive motor 142j and the brake shoe 144j could be configured to cooperate with the brake rotor 152j to create a drag force on a circumferentially extending exterior surface of the brake rotor 152j (i.e., the brake shoe 144j could be disposed radially outwardly of the rotor surface 160j and could contract radially inwardly to engage the rotor surface 160j and expand radially outwardly to disengage the rotor surface 160j).

Figure 26:
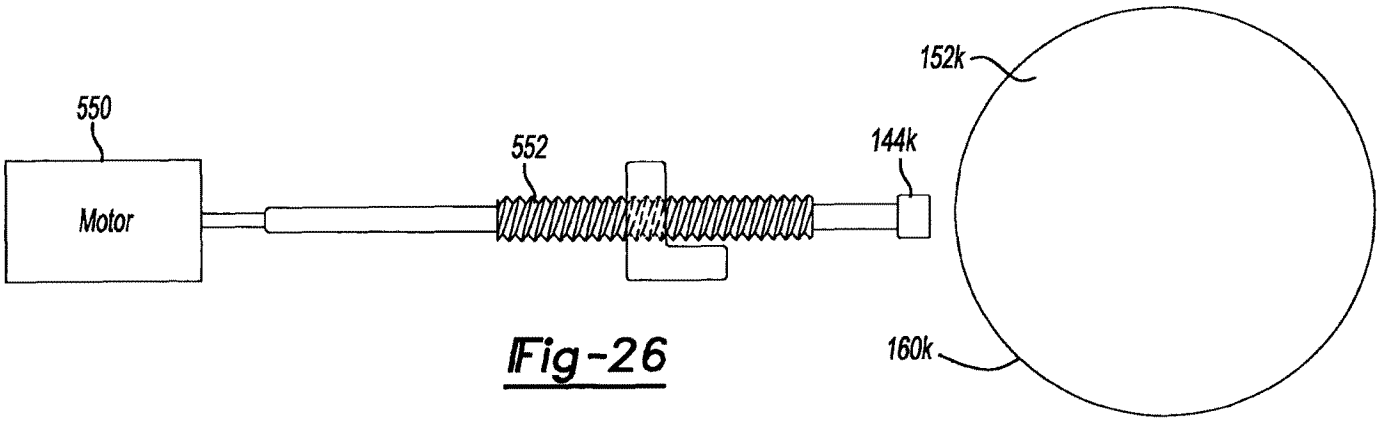
FIG. 26 is a side elevation view of an eleventh driven accessory constructed in accordance with the teachings of the present disclosure.

In FIG. 26 the linear motor comprises a motor 550 having a rotary output member that rotates a lead screw 552 to move a brake shoe 144k into contact with a rotor surface 160k of the brake rotor 152k.

Figure 27:
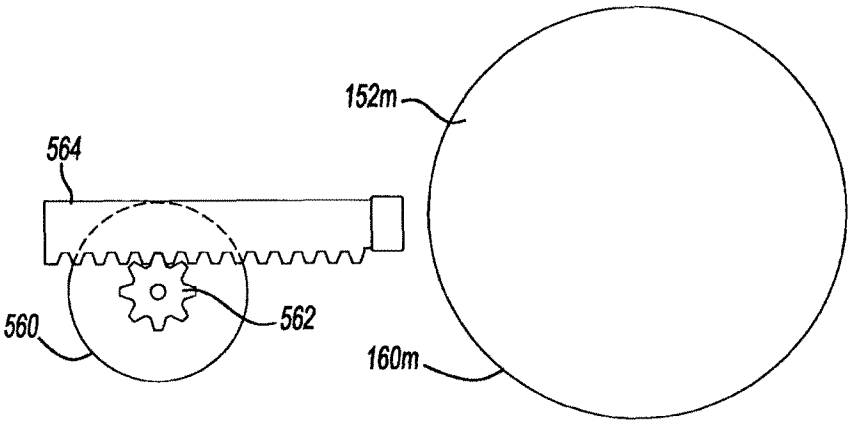
FIG. 27 is a side elevation view of a twelfth driven accessory constructed in accordance with the teachings of the present disclosure.

In FIG. 27 the linear motor comprises a motor 560 having an output member that rotates a toothed pinion 562 that is in meshing engagement with a toothed rack 564. The brake shoe 144m is mounted to an end of the toothed rack 564 and can be selectively driven into contact with the rotor surface 160m on the brake rotor 152m. It will be appreciated that in the alternative, the brake shoe 144m need not be mounted directly to the toothed rack 564 but rather could be mounted another element that is driven or moved via the toothed rack 564.

Figure 28:
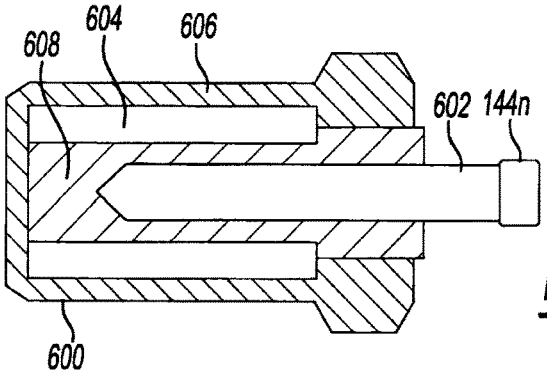
Figure 29:
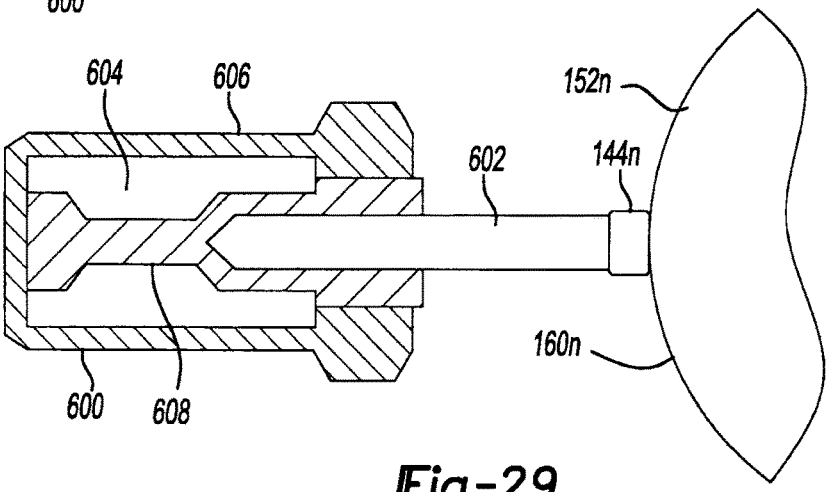

In FIGS. 28 and 29, the linear motor comprises a commercially available phase change actuator having an actuator housing 600, an output member 602, a phase change material 604, a heater 606, and a compliant member 608. The phase change material 604, the heater 606 and the compliant member 608 can be received into the actuator housing 600. The output member 602 can be slidably received in the actuator housing 600 and can be engaged to the compliant member 608. The phase change material 604 can be a material that is configured to change its volume in response to a change in its state (e.g., solid, liquid). In the particular example provided, the phase change material 604 is a wax that can be disposed about the compliant member 608. The heater 606 can be coupled to the actuator housing 600 and can be configured to change the phase of the phase change material 604 (e.g., melt). In the particular example provided, the heater 606 is an electric heater that operates on direct current power (e.g., 12 VDC power). The compliant member 608 can be formed of a suitable material and may comprise a spring. In the particular example provided, the compliant member 608 is formed of an elastomer that additionally seals the joint between the output member 602 and the actuator housing 600.

In an unactuated condition (shown in FIG. 28), the phase change material 604 is distributed about the compliant member 608 and the compliant member 608 biases the output member 602 into a returned position in which the output member 602 is substantially housed in the actuator housing 600. The heater 606 can be activated to cause the phase change material 604 to change into a phase in which the phase change material 604 has a larger volume, which increases the pressure within the actuator housing 600. In response to the increase in pressure, the compliant member 608 can deform, which permits the output member 602 to be urged outwardly of the actuator housing 600 as shown in FIG. 29 to permit the brake shoe 144n to contact the rotor surface 160n of the brake rotor 152n. It will be appreciated that after the operation of the heater 606 has been halted and the phase change material 604 begins to revert to its other phase (having reduced volume), the compliant member 608 can push the phase change material 604 radially outwardly, which can permit the compliant member 608 to pull the output member 602 back into the actuator housing 600.

While the previous example has been described as including a heater, it should be appreciated that other types of energy may be employed to change the phase of the phase change material 604. For example, heat from an internal combustion engine could be transmitted through the actuator housing 600 to the phase change material 604 to initiate a change in the phase of the phase change material 604. Additionally or alternatively, while the linear motor of the previous example has been described as having a rod-in-cylinder configuration, it will be appreciated that the linear motor could be configured differently. For example, the linear motor could have an annular configuration, similar to the annular cylinder 200 shown in FIG. 8.

Figure 30:
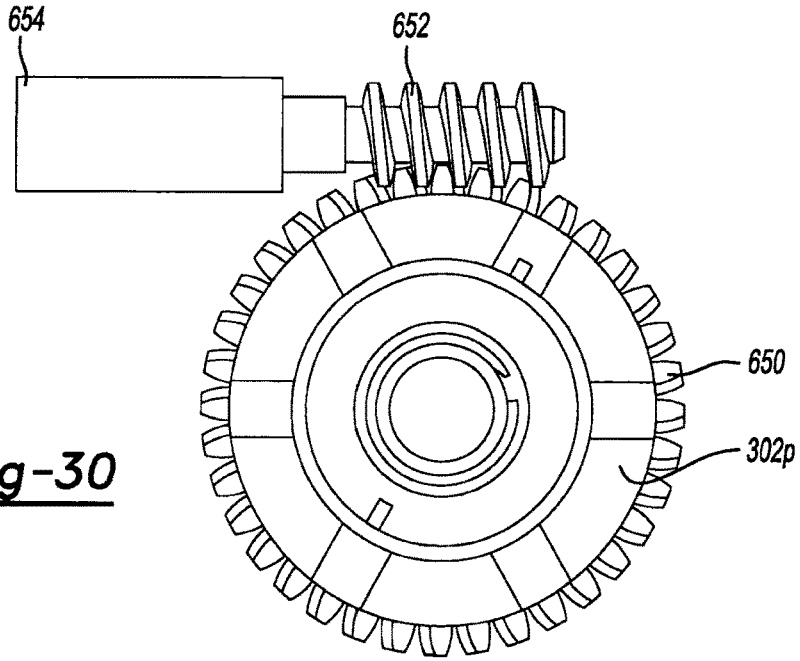
FIG. 30 is a rear elevation view a portion of a fourteenth driven accessory constructed in accordance with the teachings of the present disclosure.

A portion of another driven device constructed in accordance with the teachings of the present disclosure is illustrated in FIG. 30. In this example, the actuator is similar to that which is shown in FIGS. 15-21, except a worm drive is employed in lieu of the linear motor and linkage. In this regard, the drum actuator 302p can comprise a worm gear or wheel 650 that is driven by a worm screw 652, which in turn can be driven by a motor 654 having a rotary output.

Figure 31:
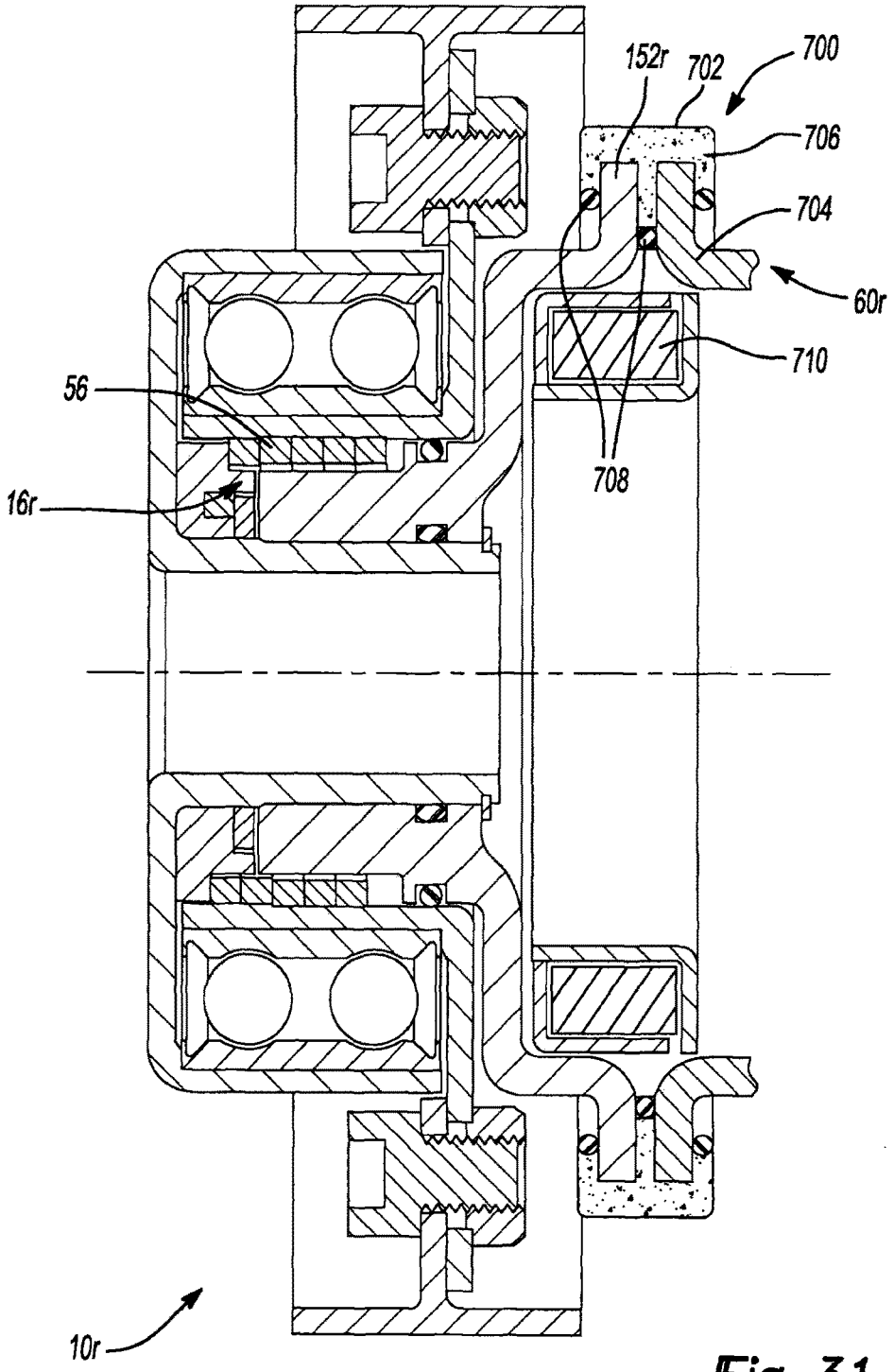
FIG. 31 is longitudinal section view of a portion of a fifteenth driven accessory constructed in accordance with the teachings of the present disclosure.

With reference to FIG. 31, a portion of another driven accessory constructed in accordance is illustrated. The clutched driven device 10r can be generally similar to that which is illustrated in FIG. 8, except that the actuator 60r includes a device 700, which has a magnetorheological fluid or an electrorheological fluid, in lieu of a linear motor. The device 700 can include a housing 702, a stationary member 704, a fluid 706, one or more seals 708, and a means for affecting a viscosity of the fluid 706. The brake rotor 152r can be received in the housing 702 opposite the stationary member 704. The housing 702 can be non-rotatably coupled to an appropriate structure, such as the housing of the water pump assembly 20 (FIG. 1). The fluid 706 can be received in the housing 702 and can be disposed between the brake rotor 152r and the stationary member 704. The stationary member 704 can be coupled to an appropriate structure such that it is disposed in a non-rotating condition. If desired, the stationary member 704 can be integrally formed with the housing 702. The seals 708 can seal the housing 702 to the brake rotor 152r and the stationary member 704. The viscosity affecting means 710 can comprise any means that causes the fluid 706 to change its viscosity. For example, if the fluid 706 is a magnetorheological fluid, the viscosity affecting means 710 can comprise a wire coil 712 that can be configured to generate a magnetic field that is suited to change the viscosity of the fluid 706. If the fluid 706 was an electrorheological fluid, the viscosity affecting means 710 could comprise a power supply that was configured to selectively apply power to fluid 706 to cause the fluid 706 to change its viscosity. It will be appreciated that the fluid 706 has a normal condition having a first viscosity that permits the brake rotor 152r to rotate in the fluid 706 without generating a significant amount of drag (i.e., so that rotary power is transmitted through the clutch assembly 16r). Operation of the viscosity affecting means 710 can cause the viscosity of the fluid 706 to change such that the fluid 706 resists rotation of the brake rotor 152r to thereby create a drag force that is imparted to the brake rotor 152r and which causes the coiling of the wrap spring 56 to inhibit the transmission of rotary power through the clutch assembly 16r.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A clutched driven device comprising:

a clutch assembly comprising a first rotary clutch portion, a second rotary clutch portion, a bearing, a wrap spring and an actuator, the first rotary clutch portion having a drive member with an interior clutch surface, the first and second rotary clutch portions being rotatably disposed about a rotary axis of the clutched driven device, the bearing being received between the first and second rotary clutch portions and supporting the first rotary clutch portion for rotation on the second rotary clutch portion, the wrap spring being disposed radially inwardly of the bearing and having a first end, a second end opposite to the first end, and a plurality of helical coils that extend between the first and second ends the first end being configured to transmit rotary power to the second rotary clutch portion, the helical coils being received against the interior clutch surface, the actuator being configured to selectively initiate coiling of the wrap spring to cause the helical coils of the wrap spring to disengage the interior clutch surface to a predetermined extent, the actuator comprising an actuator input member, the actuator input member being rotatable about the rotary axis and having a spring mount, which engages the second end of the wrap spring, and a brake rotor, the actuator being selectively operable to generate a brake force that is applied to the brake rotor to resist rotation of the actuator input member about the rotary axis.

2. The clutched driven device of claim 1, wherein the brake force is a frictional force that is transmitted to the brake rotor.

3. The clutched driven device of claim 2, wherein the actuator comprises a brake shoe that engages the brake rotor to generate the brake force.

4. The clutched driven device of claim 3, wherein the actuator further comprises a solenoid that is operable for moving the brake shoe into and/or out of contact with the brake rotor.

5. The clutched driven device of claim 4, wherein the brake shoe is mounted to an output member of the solenoid.

6. The clutched driven device of claim 4, wherein the brake shoe is coupled to the output member through at least one of a cable and a linkage.

7. The clutched driven device of claim 3, wherein the actuator further comprises a fluid-powered cylinder that is operable for moving the brake shoe into and/or out of contact with the brake rotor.

8. The clutched driven device of claim 3, wherein the actuator further comprises an element formed of a material selected from a group consisting of shape memory metal materials, bi-metallic materials, electrostrictive materials, magnetostrictive materials and combinations thereof, the element being operable for moving the brake shoe into and/or out of contact with the brake rotor.

9. The clutched driven device of claim 8, wherein the element is configured to change a diameter of the brake shoe.

10. The clutched driven device claim 3, wherein the brake shoe comprises a band that is wrapped at least partly around the brake rotor.

11. The clutched driven device of claim 3, wherein the actuator comprises a rotary motor that is operable for moving the brake shoe into and/or out of contact with the brake rotor.

12. The clutched driven device of claim 11, wherein the rotary motor is coupled to the brake shoe through at least one of a cable, a lead screw, a rack-and-pinion, and a worm drive.

13. The clutched driven device of claim 3, wherein the actuator further comprises a phase change material that has a first volume when the phase change material is in a first phase and a second volume when the phase change material is in a second phase that is different from the first phase, and wherein the first and second phases are selected from a group consisting of a solid phase, a liquid phase and a gaseous phase.

14. The clutched driven device of claim 13, wherein the phase change material is wax.

15. The clutched driven device of claim 13, wherein the actuator further comprises a heater.

16. The clutched driven device of claim 3, wherein the actuator comprises a drum actuator that is rotatable to radially expand and/or contract the brake shoe against the brake rotor.

17. The clutched driven device of claim 1, wherein the actuator comprises a fluid having at least one of magnetorehological properties and electrorehological properties.

*18. A clutched driven device, comprising:*

*a clutch assembly comprising a first rotary clutch portion, a second rotary clutch portion, a wrap spring and an actuator;*

*the first rotary clutch portion having a drive member with a clutch surface;*

*the second rotary clutch portion connected to a driven member;*

*the first and second rotary clutch portions being rotatably disposed about a rotary axis of the clutched driven device such that the second rotary clutch portion is disposed radially inward of the first rotary clutch portion;*

*the wrap spring being disposed radially inward of the first rotary clutch portion and radially outward of the second rotary clutch portion, the wrap spring having a first end, a second end opposite to the first end, and a plurality of helical coils that extend between the first and second ends, the first end being configured to transmit rotary power to the second rotary clutch portion, the helical coils being received against the clutch surface;*

*the actuator being configured to selectively initiate coiling of the wrap spring to cause the helical coils of the wrap spring to at least partly disengage from the clutch surface;*

*the actuator comprising an actuator input member, the actuator input member being rotatable about the rotary axis and having a spring mount, which engages the second end of the wrap spring, and a brake rotor;*

*the actuator being selectively operable to generate a brake force that is applied to the brake rotor to resist rotation of the actuator input member about the rotary axis;*

*wherein the actuator comprises a lead screw arranged to translate transversely to the rotary axis to generate the brake force.*

*19. The clutched driven device of claim 18, including a brake shoe disposed at an end of the lead screw for engaging the brake rotor.*

*20. The clutched driven device of claim 19, wherein the actuator comprises a rotary motor that is operable for moving the brake shoe into and/or out of contact with the brake rotor.*

* * * * *